United States Patent
Schreiner et al.

(10) Patent No.: US 8,631,340 B2
(45) Date of Patent: Jan. 14, 2014

(54) TAB MANAGEMENT IN A USER INTERFACE WINDOW

(75) Inventors: Tony E Schreiner, Redmond, WA (US); Jeremiah S Epling, Woodinville, WA (US); Helen E Drislane, Seattle, WA (US); Michael J Ens, Remond, WA (US)

(73) Assignee: Microsoft Corporation, Redmond, WA (US)

( * ) Notice: Subject to any disclaimer, the term of this patent is extended or adjusted under 35 U.S.C. 154(b) by 694 days.

(21) Appl. No.: 12/146,429

(22) Filed: Jun. 25, 2008

(65) Prior Publication Data

US 2009/0327947 A1    Dec. 31, 2009

(51) Int. Cl.
*G06F 3/14* (2006.01)

(52) U.S. Cl.
USPC ........... 715/777; 715/738; 715/764; 715/767; 715/816; 715/817; 717/174; 709/224; 705/37; 439/152; 345/753

(58) Field of Classification Search
USPC ............. 715/200–277, 700–867; 345/30–111
See application file for complete search history.

(56) References Cited

U.S. PATENT DOCUMENTS

| | | | |
|---|---|---|---|
| 5,559,946 A | | 9/1996 | Porter |
| 5,745,716 A | | 4/1998 | Tchao et al. |
| 7,181,698 B2 | | 2/2007 | Shahrbabaki et al. |
| 7,536,650 B1 * | | 5/2009 | Robertson et al. ............ 715/767 |
| 7,752,572 B1 * | | 7/2010 | Shahrbabaki et al. ........ 715/817 |
| 2002/0130904 A1 * | 9/2002 | Becker et al. ................. 345/753 |
| 2003/0217359 A1 * | 11/2003 | Ohi et al. ....................... 717/174 |
| 2005/0278444 A1 * | 12/2005 | Sims et al. ..................... 709/224 |
| 2006/0020538 A1 * | 1/2006 | Ram et al. ........................ 705/37 |
| 2006/0206834 A1 | 9/2006 | Fisher et al. |
| 2006/0218500 A1 | 9/2006 | Sauve et al. |
| 2006/0230356 A1 | 10/2006 | Sauve et al. |
| 2006/0271858 A1 | 11/2006 | Yolleck et al. |
| 2007/0067733 A1 | 3/2007 | Moore et al. |
| 2007/0088680 A1 | 4/2007 | Sauve et al. |
| 2007/0128899 A1 * | 6/2007 | Mayer .......................... 439/152 |
| 2007/0186175 A1 | 8/2007 | Hudson et al. |
| 2007/0198947 A1 | 8/2007 | Cox et al. |

(Continued)

OTHER PUBLICATIONS

Microsoft, Microsoft Office Excel, Jan. 30, 2007, Microsoft Corporation, screen shots of working program (Excel 2007), p. 1-10.*

(Continued)

*Primary Examiner* — Ruay Ho
(74) *Attorney, Agent, or Firm* — Wolfe-SMBC

(57) ABSTRACT

Techniques to facilitate finding a tab or tabs in a user interface window are described. Various embodiments present tabs, individual tabs being associated with an opened document such as a web page or an activity, in a user interface window and automatically group at least some of the tabs together in a visually distinctive way. In at least some embodiments, this grouping is performed in response to a user interacting with the tabs in a particular way. For instance, a user may cause a tab to be created or moved within the user interface window such that the tab is grouped with a tab group or ungrouped from a tab group. Furthermore, one or more embodiments provide for certain tab-related actions, such as selecting an active tab and changing a display of a title of a tab, which can be performed in a manner based at least in part on this grouping.

20 Claims, 18 Drawing Sheets

(56) References Cited

U.S. PATENT DOCUMENTS

| | | | |
|---|---|---|---|
| 2007/0288866 A1* | 12/2007 | Ur et al. | 715/816 |
| 2008/0005686 A1* | 1/2008 | Singh | 715/764 |
| 2009/0164934 A1* | 6/2009 | Bhattiprolu et al. | 715/777 |
| 2010/0180225 A1* | 7/2010 | Chiba et al. | 715/777 |
| 2011/0161828 A1* | 6/2011 | Sauve et al. | 715/738 |

OTHER PUBLICATIONS

"Tab Groups", retrieved at <<http://paranoid-androids.com/tabgroups/>>, on Oct. 8, 2007, pp. 1-2.

Hassan et al, "Enhance Feature of Mozilla Firefox—Tab Grouping", Aug. 3, 2007, pp. 16.

"Tab Grouper Project",<<Retrieved at http://m.domaindlx.com/tabgrouper/>>, on Oct. 10, 2008, pp. 1-5.

Hardmeier, "Supercharge Your Surfing with Tabbed Browsing", Retrieved at<< http://www.microsoft.com/windows/ie/community/columns/tabbedbrowsing.mspx>>, Dec. 5, 2005, pp. 1-4.

"Welcome to IE-Vista", Retrieved at << http://www.ie-vista.com/tabs_groups.html>>,on Oct. 8, 2007, pp. 1-3.

* cited by examiner

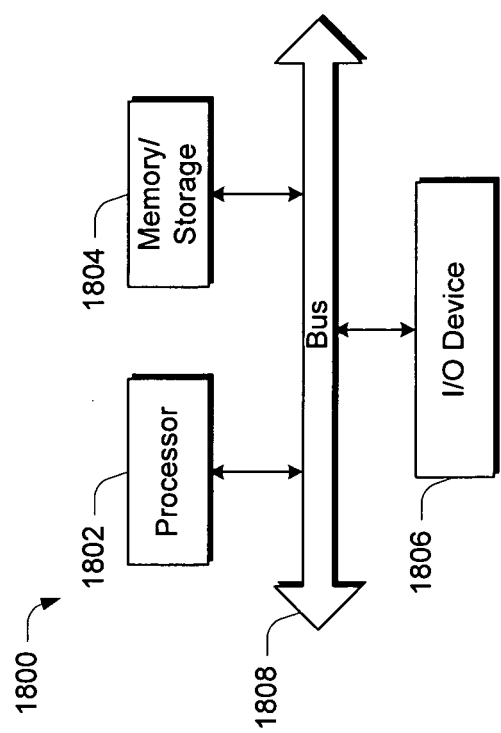

TAB MANAGEMENT IN A USER INTERFACE WINDOW

BACKGROUND

With an application having a tabbed user interface, such as a tabbed web browser, a user can open multiple documents within a single window. After being opened, each of these documents is typically identified by a tab that remains visible to the user such that the user can then navigate to a particular opened document by selecting the tab identifying that document. When the tab is selected (as an "active tab"), an associated document is presented to the user in the window as the "active document" while other opened documents, associated with unselected tabs ("inactive tabs"), are hidden from the user's view as "inactive documents".

While tabbed user interfaces provide numerous practical advantages, it is not surprising that as the number of opened documents increases in a window, it becomes increasingly difficult for the user to find a particular tab of interest. For example, consider a user writing a research paper. This user may use a tabbed web browser to peruse multiple web pages to find information of interest. Once information of interest is found, the user may then use another application, such as a word processor, and copy information of interest into a word processor's document. During this process of opening multiple web pages and context switching between the web browser and the word processor, the user is likely to find it increasingly difficult to keep track of a specific tab(s) of interest—such as the last tab they were engaged with or the tab(s) they wish to access next. To exacerbate this confusion, the user might be interrupted by incoming emails, telephone calls or other distractions during this process.

Unfortunately, current tabbing techniques typically present the user with a window containing relatively indistinguishable tabs arranged in a random, predefined or ad hoc manner independent of any association the tabs might have to one another. This leaves the user with little, if any, indication of whether or not a particular tab is a tab of interest or associated with another tab of interest. Furthermore, interacting with tabs in these situations can be time consuming and difficult for the user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques to facilitate finding or otherwise interacting with a tab or tabs in a user interface window are described. Specifically, various embodiments present tabs, at least some of which being associated with an opened document such as a web page, in a user interface window and automatically group at least some of the tabs together in a visually distinctive way. In at least some embodiments, this grouping is performed in response to a user interacting with the tabs in a particular way. For instance, a user may cause a tab to be created or moved within the user interface window such that the tab is grouped with a tab group or ungrouped from a tab group. Furthermore, one or more embodiments provide for certain tab-related actions, such as selecting an active tab and changing the display of a tab's title, which can be performed in a manner based at least in part on this grouping.

BRIEF DESCRIPTION OF THE DRAWINGS

The same numbers are used throughout the drawings to reference like features.

FIG. 18 illustrates an example system that can be used to implement one or more embodiments.

DETAILED DESCRIPTION

Overview

Figure 1:
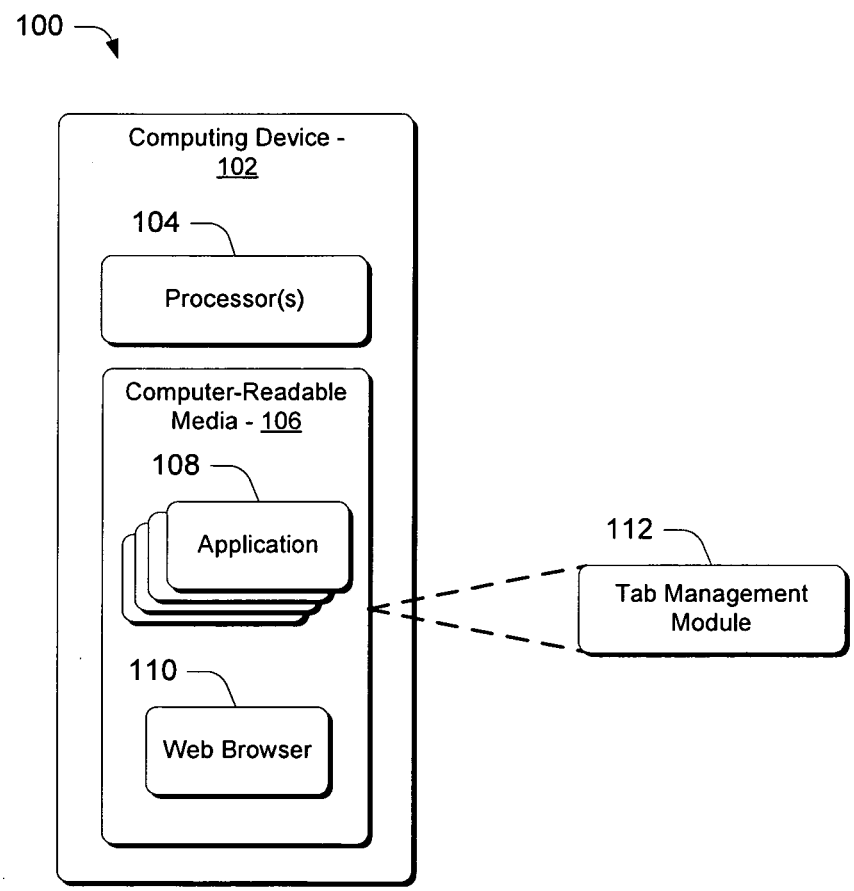
FIG. 1 illustrates an operating environment in which various principles described herein can be employed in accordance with one or more embodiments.

Techniques to facilitate finding a tab or tabs in a user interface window or otherwise interacting with the tab(s) (e.g., opening tab(s), closing tab(s) and/or navigating among tabs) are described. In this regard, various embodiments present tabs, at least some of which being associated with an opened document such as a web page, in a user interface window and automatically group at least some of the tabs together in a visually distinctive way. In at least some embodiments, this grouping is performed in response to a user interacting with the tabs in a particular way. For instance, a user may cause a tab to be created or moved within the user interface window such that the tab is grouped with a tab group or ungrouped from a tab group. Furthermore, one or more embodiments provide for certain tab-related actions, such as selecting an active tab and changing a tab title, which can be performed in a manner based at least in part on this grouping. The tabs can be used to represent any suitable type of content that can be represented in a tab. For example, a tab can represent or otherwise be associated with a web page. Alternately of additionally, tab can be associated with an invoked activity, such as a searching activity, defining activity, mapping activity or any other suitable type of activity. Such can take place when an activity is initiated by a user. In at least some embodiments, activities can be accessed through an instrumentality in a web browser, such as through an instrumentality presented in the chrome of a web browser's user interface. One such instrumentality can include a context menu. In this embodiments, when a user accesses or is otherwise exposed to an activity, this invoked activity can be represented by a tab and, accordingly, processed in accordance with the techniques described below.

In one or more embodiments, multiple tabs that are individually associated with a web page or other content, such as an activity, are displayed in a web browser user interface window. At least some of these tabs are associated together in a tab group and visually distinguished by being positioned in a location that is indicative of the tab group, such as adjacent to one another for instance. In one or more embodiments, these grouped tabs are depicted with visual indicia indicative of the tab group, such as a particular color and/or pattern for instance. As such, tabs of the tab group share common visual indicia making them easily distinguishable as belonging to the group. In at least some embodiments, a tab can be associated with one or more other tabs in response to a user action, such as creating a new tab or moving one or more tabs into the tab group. Furthermore, a tab can be disassociated from a tab group in response to a user action, such as moving it out of the tab group for instance.

In the discussion that follows, a section entitled "Operating Environment" is provided which describes an environment in which one or more embodiments can be employed. Following this, a section entitled "Example User Interface" is provided and describes an example user interface in accordance with one or more embodiments. Following this, a section entitled "Example Method—Presenting Tabs" is provided and describes an example method in accordance with one or more embodiments. Following this, a section entitled "Example User Interfaces—Creating Tabs" is presented and describes example user interfaces associated with creating tabs in accordance with one or more embodiments. Following this, a section entitled "Example Method—Creating a Tab" is presented and describes an example method associated with creating a tab in accordance with one or more embodiments. Following this, a section entitled "Example User Interfaces—Moving Tabs" is provided and describes example user interfaces associated with moving tabs in accordance with one or more embodiments. Following this, a section entitled "Example Method—Moving a Tab" is presented and describes an example method associated with moving a tab in accordance with one or more embodiments. Following this, a section entitled "Example Method—Selecting an Active Tab" is presented and describes an example method associated with selecting a tab in accordance with one or more embodiments. Following this, a Section entitled "Example User Interface—Truncating Tab Titles" is provided and describes example user interfaces associated with truncating tab titles in accordance with one or more embodiments. Following this, a section entitled "Example Method—Truncating a Tab Title" is presented and describes an example method associated with truncating a tab title in accordance with one or more embodiments. Following this, a section entitled "Example Software Architecture" is provided and describes an example software architecture in accordance with one or more embodiments. Last, a section entitled "Example System" is provided and describes an example system that can be utilized to implement one or more embodiments.

Operating Environment

FIG. 1 illustrates an operating environment in accordance with one or more embodiments, generally at 100. Environment 100 includes computing device 102 having one or more processors 104, one or more computer-readable media 106 and one or more applications 108 that reside on the computer-readable media and which are executable by the processor(s). The computer-readable media can include, by way of example and not limitation, all forms of volatile and non-volatile memory and/or storage media that are typically associated with a computing device. Such media can include ROM, RAM, flash memory, hard disk, removable media and the like. One specific example of a computing device is illustrated and described below in FIG. 18. In addition, computing device 102 includes a software application in the form of web browser 110. Any suitable web browser can be used, examples of which are available from the assignee of this document and others.

In one or more embodiments, computer-readable media 106 can include a tab management module 112 that provides tab grouping functionality described above and below. In at least some embodiments, tab management module 112 is integrated with, and comprises part of, web browser 110. Alternately or additionally, all or part of tab management module 112 can be integrated with and comprise part of one or more other applications or modules, such as those found in one or more applications 108 for instance.

Computing device 102 can include, by way of example and not limitation, portable computers, handheld computers such as personal digital assistants (PDAs), cell phones and the like.

Example User Interface

Figure 2:
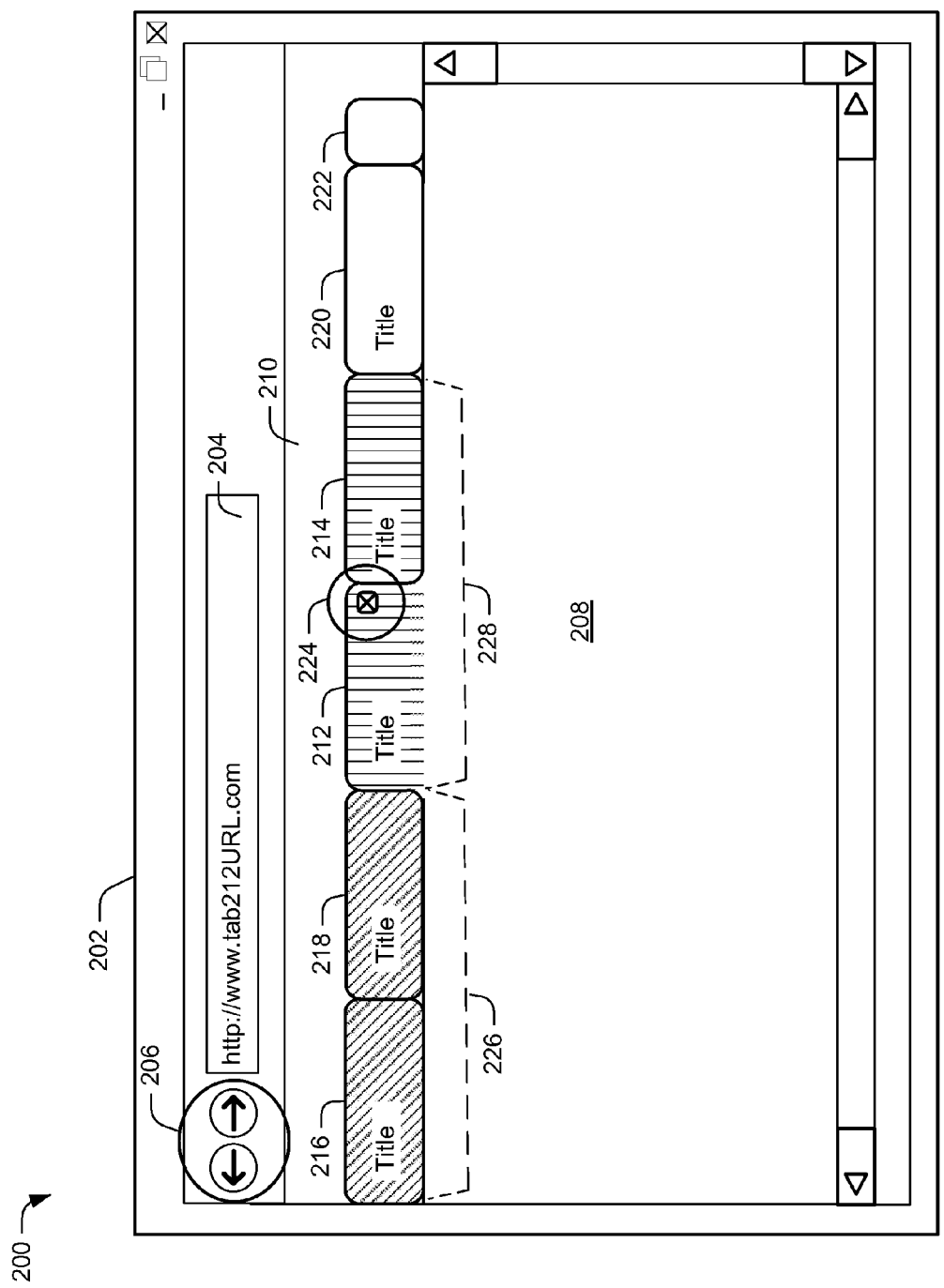
FIG. 2 illustrates a user interface in accordance with one or more embodiments.

FIG. 2 illustrates, in accordance with one or more embodiments, an example tabbed user interface 200 implementing the tab grouping functionality described above and below. For purposes of discussion, tabbed user interface 200 is described in the context of a web browser user interface associated with a web browser application, such as web browser 110 for example. However it is to be appreciated and understood that the described tab grouping functionality can be implemented by any suitable application, such as a spreadsheet application, word processing application or operating system user interface application for instance, without departing from the spirit and scope of the claimed subject matter.

In this particular example, tabbed user interface 200 is defined within resizable, closeable browser window 202 which, as will be appreciated and understood by those skilled in the art, includes various features which facilitate navigating to web pages and other content such as activities. Specifically, in this example, these features include address bar 204 and navigation direction buttons 206. Note that address bar 204 not only indicates the uniform resource locator (URL) of the opened web page (or other document) being currently displayed in an active display area 208, but also allows a user to type in a URL that can be navigated to and opened in browser window 202.

Note that by virtue of being a tabbed user interface, multiple web pages or other content can be opened in browser window 202. As such, one or more of these opened web pages can be displayed at any particular time in active display area 208. Also note that each opened web page is associated with a tab that remains visible in a region of browser window 202 designated by tab band 210. This allows a user to select a particular opened web page to display in active display area 208 by selecting a tab of interest associated with that web page. As will be appreciated by those skilled in the art, selecting can be accomplished in any suitable way such as by placing the cursor over a region of the tab of interest and clicking an appropriate mouse button.

In this example, tabs 212, 214, 216, 218, and 220 are each associated with an opened web page or activity and have a displayed title ("Title") which describes or is otherwise related to the web page or activity with which it is associated. New tab button 222, however, is not associated with an opened web page or activity but can nevertheless still be selected in order to open a new tab. More particularly, by selecting new tab button 222, a new tab can be opened that is not yet associated with an opened web page or activity. As such, tab 222 can be referred to as a "new blank tab" because it can be selected as an active tab before being associated with an opened web page or activity. Selecting a new tab button 222, is but one of several possible ways by which a user can open a new tab. Other possible ways can include, without limitation, right-clicking a link within an opened web page or activity and selecting an option to open the link in a new tab or selecting a menu option in the user interface to open a new tab.

As noted above, when a tab of interest is selected, it becomes the active tab and its corresponding opened web page or activity (or blank page if the tab of interest is not yet associated with an opened web page or activity) is presented in active display area 208. Here, tab 212 is depicted as the active tab while tabs 214-220 are depicted as inactive tabs. As such, in this example, the opened web page or activity (not shown) associated with tab 212 is displayed in active display area 208 and its URL (http://www.tab212URL.com) is displayed in address bar 204. Note that in this example, only active tab 212 is shown with closing button 224 which, when selectively clicked, closes tab 212 and its associated web page or activity. However, this is not to be construed as meaning that any of the tabs, including tabs 214-220 and new tab button 222, cannot be closed by other suitable means at any particular time. By way of example and not limitation, other suitable means for closing a tab might include placing the cursor over a region of the tab to be closed, clicking the appropriate mouse button and selecting a "close" option from a drop-down menu that appears.

In this example, note that the above-mentioned tab grouping functionality is manifest in the presentation of tabs 212-220 and new tab button 222. Specifically, tabs 212 and 214 are grouped together in a visually distinctive manner by being depicted adjacent to one another and by being depicted with a common pattern that is not shared by tabs 216-220 and new tab button 222. As such, tabs 212 and 214 are visually distinguished as belonging to a tab group, designated here as tab group 228. In this example, a tab belongs to one tab group at a time. As such, tabs 212 and 214 do not belong to another tab group as long as they belong to tab group 228. Similarly, tabs 216 and 218 are also grouped together in a visually distinctive manner by being depicted adjacent to one another and by being depicted with a common pattern not shared by tabs 212, 214, 220 or new tab button 222. As such, tabs 216 and 218 are visually distinguished as belonging to a tab group as well, here designated as tab group 226. Also note that tabs 220 and new tab button 222 are not grouped with any other tabs. As such, tab 220 is depicted as being ungrouped. Examples of how various tabs can become members of a group are provided below.

While in this example the tabs in each tab group are visually distinguished by being depicted in a location adjacent to one another and by sharing a common pattern, it is to be appreciated and understood that additional or alternative visual indicia can be used as well. By way of example and not limitation, tabs in a particular tab group can be depicted with a common color that is not shared by other tabs not belonging to that particular tab group. So, for example, one tab group might be identified by the color red, while another tab group might be identified by the color green and so on. Color and/or pattern distinction provides the user with a quick visual reference for identifying tabs in a particular tab group.

Finally, note that for the sake of clarity and ease of discussion, only two tab groups (tab groups 226 and 228), each consisting of two tabs, are illustrated in this example. However, it is to be appreciated and understood that any number of tab groups can be formed, and any number of tabs can comprise a tab group, without departing from the spirit and scope of the claimed subject matter. Of course, in some embodiments, practical usability concerns may warrant limiting the number of tab groups possible or the tab capacity of tab groups. For instance, in some embodiments it might be determined that allowing more than four or five tab groups might confuse a user or otherwise hinder them from finding a particular tab of interest. Alternatively or additionally, in some embodiments it might be determined that allowing more than four or five types of distinct visual indicia might confuse a user or otherwise hinder them from finding a particular tab of interest. In such embodiments, it could thus be possible for tabs in more than one group to have the same visual indicia. However, in such situations, confusion could nevertheless be reduced by insuring that tabs of different tab groups sharing the same visual indicia are not located adjacent one another.

Example Method—Presenting Tabs

Figure 3:
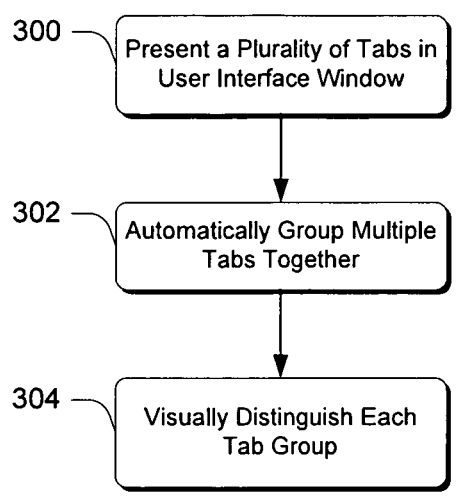
FIG. 3 is a flow diagram that describes steps in a method in accordance with one or more embodiments.

FIG. 3 is a flow diagram that describes steps in a method in accordance with one or more embodiments. This method can be implemented in connection with any suitable hardware, software, firmware or combination thereof. In at least some embodiments, aspects of this method can be implemented by an application, such as a suitably configured web browser. It is to be appreciated and understood, however, that aspects of the described method can be implemented by an application other than a web browser.

Step 300 presents a plurality of tabs in a user interface window. This step can be accomplished in any suitable manner such that a user can view the tabs and interact with one or more of them, as described above and below in more detail. As noted above, the user interface can be any suitable type of user interface associated with any suitable application, such as tabbed user interface 200 and web browser 110 for example. Step 302 automatically groups multiple tabs together to form one or more tab groups. As will be appreciated and understood by those skilled in the art, tab grouping can greatly aid the user in not only finding a tab or tab(s) of interest but also in interacting with a tab or tabs. For instance, opening or closing multiple tabs that are related can be an onerous undertaking if the user must first manually determine which tabs are related and then open or close each tab individually. As such, having tabs automatically grouped such that an entire tab group is identifiable and can be opened or closed with a single click or other user action can be extremely beneficial—especially considering that in at least some embodiments, tabs can be grouped and positioned according to the order in which they were opened.

Continuing, as noted above, in at least some embodiments automatic grouping is performed in response to the user interacting with the tabs in a particular way, such as by opening a new tab from within an opened web page or activity which is itself represented by a tab, or by moving a tab into a tab group, such as by clicking and dragging a tab to relocate it to a new location within a tab band. In addition, tabs can be automatically ungrouped, or disassociated, from a tab group in response to the user interacting with the tabs in a particular way, such as moving a tab out of a tab group for example. By virtue of the fact that this tab grouping or ungrouping can be performed automatically in response to an event such as a user interaction, the user does not have to manually manage tab groups (e.g., manually associate and disassociate tabs) in order to benefit from the described tab grouping functionality.

Continuing, step 304 visually distinguishes each tab group. As described and illustrated above and below, in at least some embodiments, this is accomplished by depicting each grouped tab in a location indicative of its tab group and with visual indicia indicative of its tab group, such as a distinctive pattern and/or color for example.

Example User Interfaces—Creating Tabs

Figure 4:
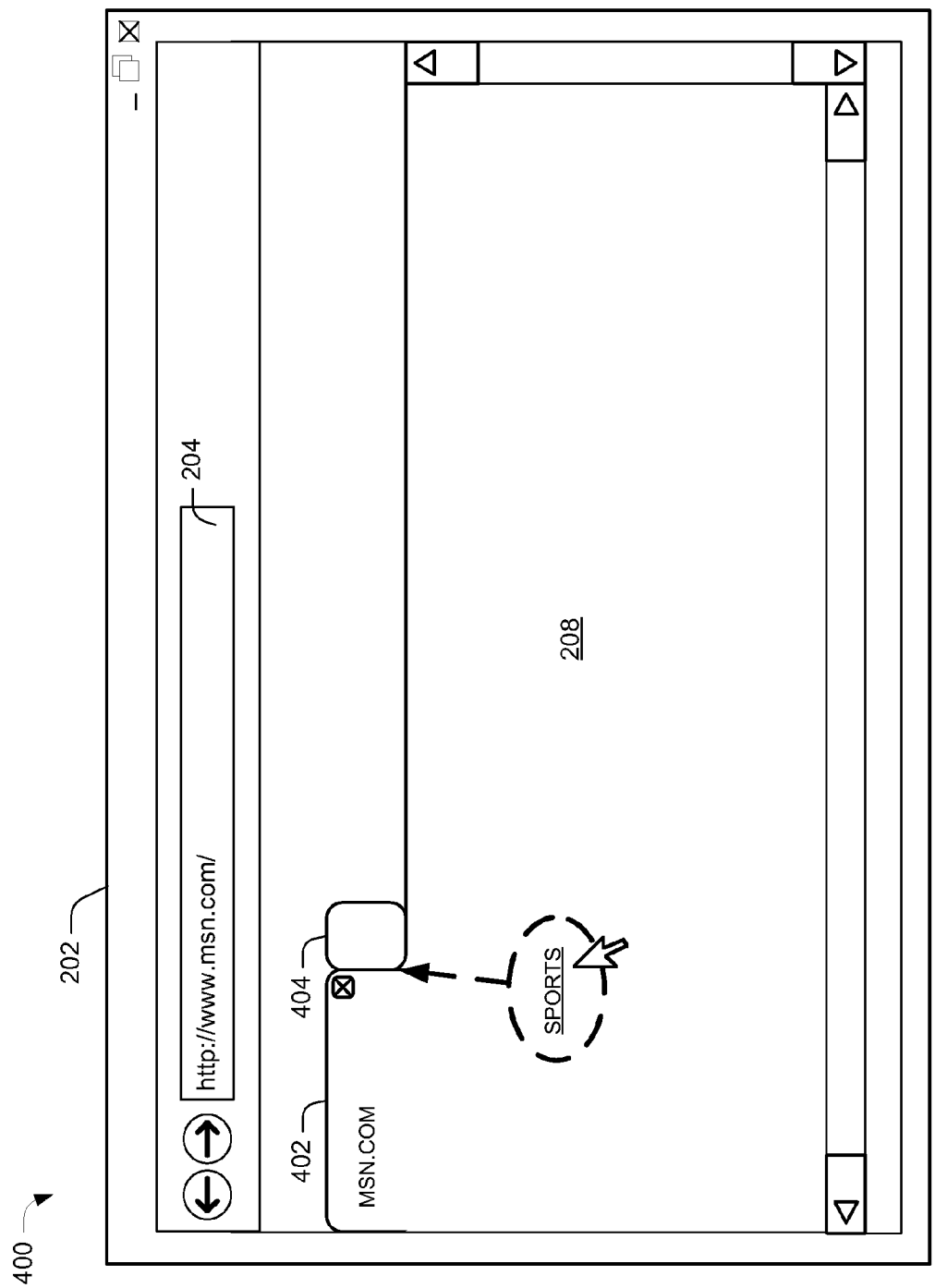
FIG. 4 illustrates a user interface in accordance with one or more embodiments.

Recall that automatic grouping, as described above, can be performed in response to a user interacting with tabs in a particular way, such as causing a new tab to be created in the user interface window. As but one example of this, consider FIGS. 4-7 which illustrate example user interfaces in the context of browser window 202 described above. Referring to FIG. 4 generally at 400, browser window 202 includes tabs 402 and new tab button 404. Tab 402 is the active tab in browser window 202 and is associated with an opened MSN web page, which is evident from the URL "http://www.msn-.com" displayed in address bar 204, the title ("MSN.COM") of tab 402 and—although not expressly shown—the web page's content displayed in active display area 208. New tab button 404 is not associated with an opened web page but can nevertheless still be selected in order to open an active tab.

Note that in FIG. 4, the content displayed in active display area 208 includes a link entitled "SPORTS" which, as will be appreciated and understood by those skilled in the art, is associated with a URL for a new web page. As such, a user can select and open this link (by any appropriate means such as control-clicking on the link, middle-clicking on the link or right-clicking on the link and selecting a "open in new tab" option, for example) and cause the web browser application associated with browser window 202 to navigate to this new web page. In this example, the new web page would be then automatically presented as the active web page in active display area 208.

Figure 5:
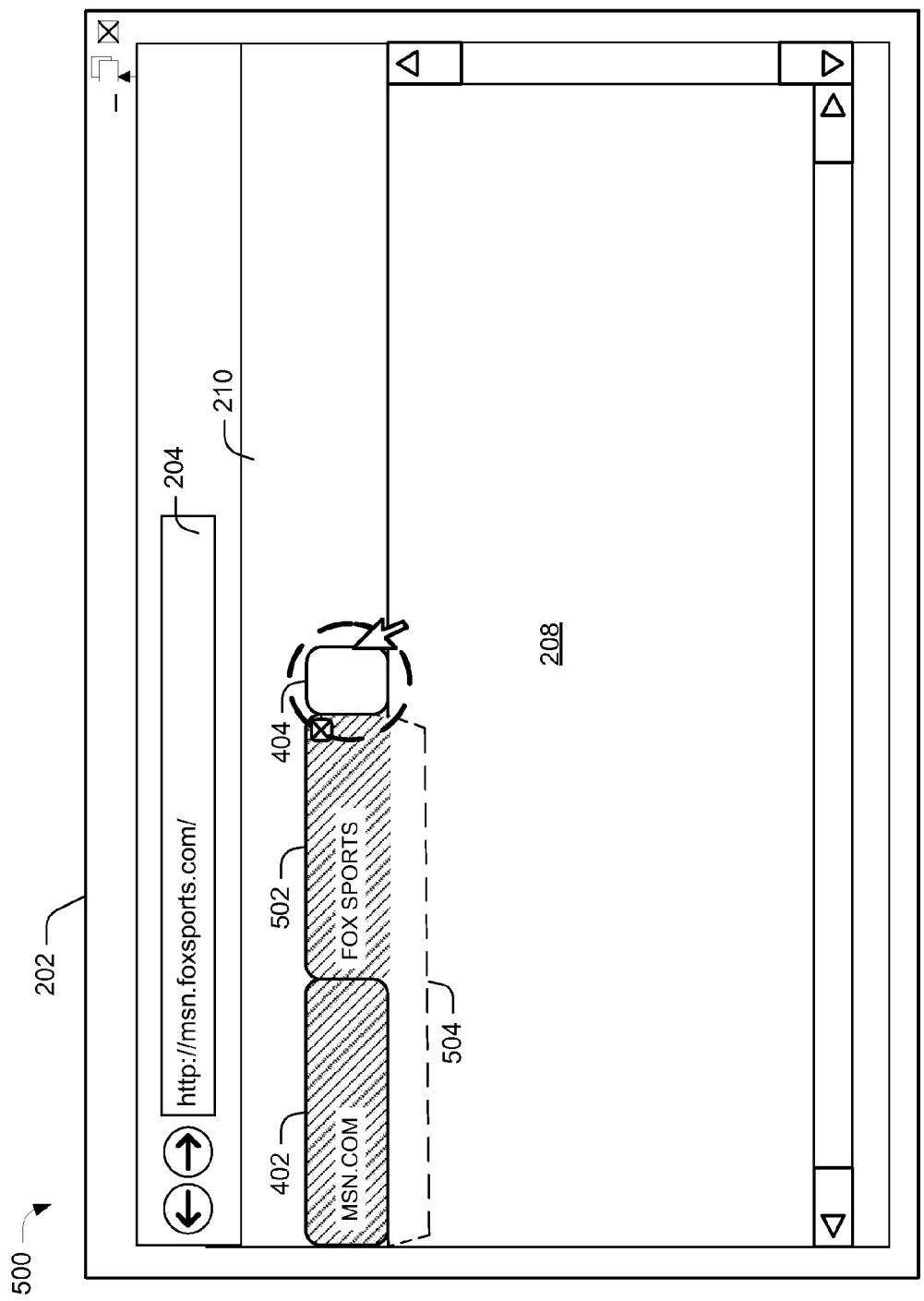
FIG. 5 illustrates a user interface in accordance with one or more embodiments.

Continuing, assume now that the user selects and opens the "SPORTS" link in FIG. 4, as shown by the dotted oval overlying the "SPORTS" link and the cursor overlying the dotted oval. In this case, the user is presented with a user interface as shown in FIG. 5 generally at 500. In this example, note that a new tab, tab 502, is automatically created in response to the "SPORTS" link being opened. Furthermore, note that tab 502 is now presented as the active tab in browser window 202 and is associated with an opened MSN FOX SPORTS web page, which is evident from the URL "http://msn.foxsports.com" now displayed in address bar 204, by the title of tab 502 ("FOX SPORTS") and—although not expressly shown—by the MSN FOX SPORTS web page's content displayed in active display area 208.

By virtue of the user selecting and opening the "SPORTS" link from within the MSN web page, tab 402 can be considered the parent tab of tab 502. As such, in this example, tabs 402 and 502 are grouped together to form tab group 504. In this example, this grouping is performed in response to the user selecting and opening the "SPORTS" link from within the MSN web page—thus causing a new tab to be created from within a parent tab. Furthermore, note that tabs 402 and 502 are visually distinguished as being grouped together in tab band 210 by being depicted adjacent to one another and by being depicted with a common pattern. As noted above, the tab group can also be visually distinguished by color and/or pattern and color.

Opening a new web page from within an existing opened web page is not the only way in which a user can cause a new tab to be created. By way of example and not limitation, a user may also unintentionally cause a new tab to be created by navigating to a certain web page or merely by moving the cursor to a certain position within a user interface window. Often, these types of windows are referred to as "pop up" windows because the user may not have known or intended that a new tab and web page be created. Whether or not a "pop up" window is created and whether or not a new tab and web page is opened when a "pop up" is created depends on how the web browser is configured. For instance, a "pop up" window can open as a new web page associated with a new tab when the user interface window is configured as such. Alternatively, the user interface window can be configured such that an opened "pop up" window is not presented as a new web page and tab and is instead presented as a smaller window within the existing active web page of the user interface window.

Figure 6:
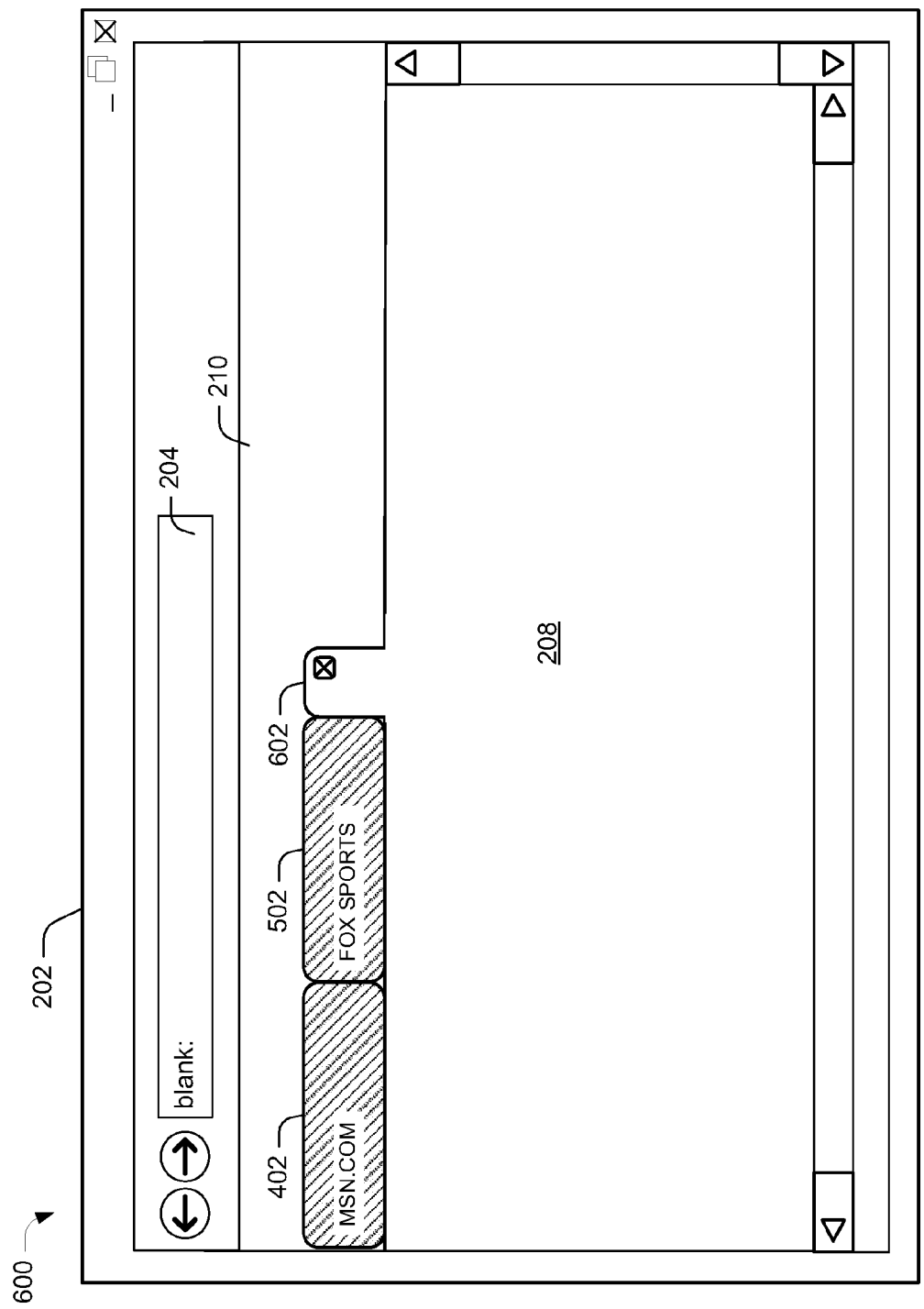
FIG. 6 illustrates a user interface in accordance with one or more embodiments.

Continuing, additional ways in which a user can cause a new tab to be created include selecting a menu option in a user interface window or, as noted above, by selecting a new blank tab, (such as by clicking or otherwise selecting new tab button 404) as the active tab and then entering a URL for a new web page in address bar 204. As such, assume now that in FIG. 5, the user decides to select new tab button 404 to open a new active tab in order to enter a new URL in address bar 204. This is illustrated in FIG. 5 by the dotted oval overlying new tab button 404 and the cursor overlying the dotted oval. Note that in response to new tab button 404 being selected, a new tab will be created. This is illustrated in FIG. 6, generally at 600, where new tab 602 is created as the active tab in browser window 202. Furthermore, since new tab 602 is not associated with an opened web page, there is not a URL displayed in address bar 204. As such, the user can enter a URL in address bar 204 to navigate to and open a new web page without having to navigate away from the web pages associated with tabs 402 and 502.

Figure 7:
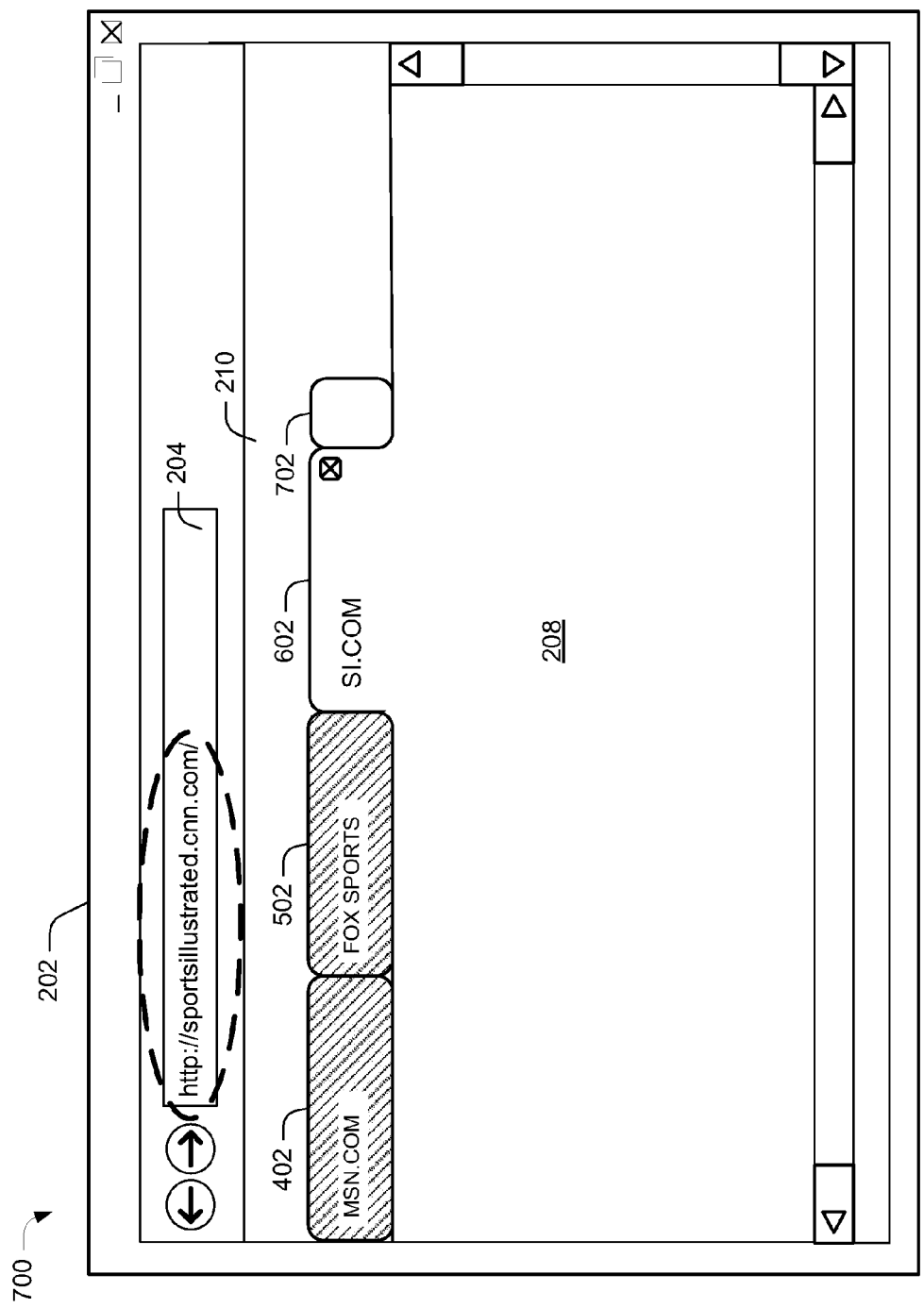
FIG. 7 illustrates a user interface in accordance with one or more embodiments.

Continuing, assume now that the user indeed decides to enter a URL in address bar 204. This is illustrated in FIG. 7 generally at 700, as shown by the dotted oval overlying address bar 204. Note here that the user has entered a URL in address bar 204 to navigate to and open the corresponding web page, which is evident by the URL "http://sportsillustrated.cnn.com" now displayed in address bar 204, by the displayed title of tab 602 (now "SI.COM") and—although not expressly shown—the SPORTSILLUSTRATED-.CNN.COM web page's content displayed in active display area 208. Finally, note that in this example, a new new tab button, here designated new tab button 702, is automatically created and positioned on the right side of tab band 210 when new tab button 404 is no longer available.

As noted above, a tab can be created responsive to a user selecting an activity from, for example, an instrumentality appearing in the user interface of their web browser. Activities can be treated, with respect to tab management activities, as described above and below.

Example Method—Creating a Tab

Figure 8:
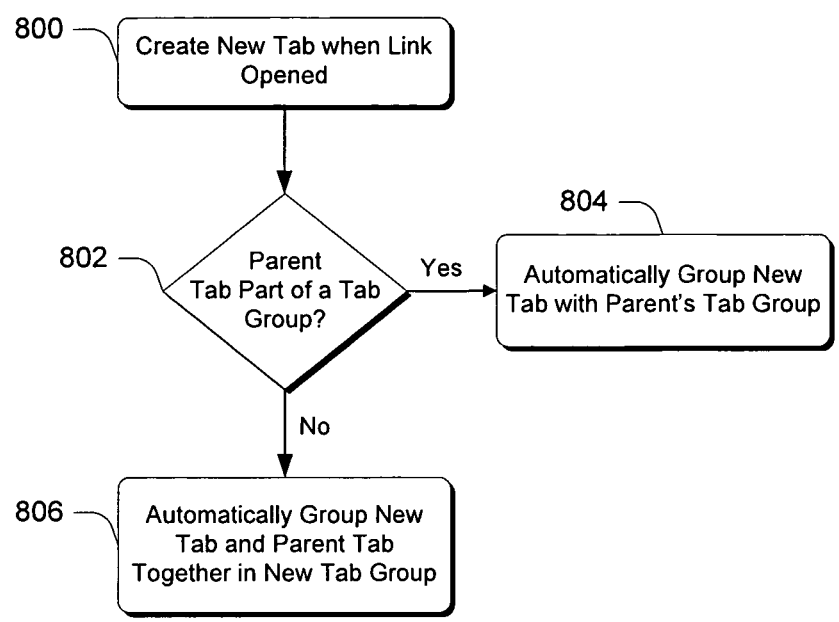
FIG. 8 is a flow diagram that describes steps in a method in accordance with one or more embodiments.

As but one example of the user interactions described above and illustrated in FIGS. 4-7, consider FIG. 8. FIG. 8 is a flow diagram that describes steps in a method in accordance with one or more embodiments. This method can be implemented in connection with any suitable hardware, software, firmware or combination thereof. In at least some embodiments, aspects of this method can be implemented by a suitable application implementing a suitable user interface window, such as web browser 110 and browser window 202 described and illustrated above. It is to be appreciated and understood, however, that aspects of the described method can be implemented by an application other than a web browser or a browser window.

Step 800 creates a new tab when a link is opened. As described and illustrated in example above, when a user opens a link from within a parent web page having an associated parent tab, a new tab can be created in the user interface window. As such, the user intentionally causes a new tab to be created. Alternatively, as mentioned above, a user may unintentionally cause a new tab to be created when a "pop up" window is opened in response to some user interaction—such as navigating to a particular web page for example. Step 802 determines whether the parent tab is part of a tab group. In one or more embodiments, this determination is made at the time the new tab is created and thus the grouped state of the parent tab at that time is relevant to the determination. For purposes of this discussion, a certain tab's grouped state can refer to any grouping-related characteristic of a tab. For example, a certain tab may have a grouped state of either "grouped" or "ungrouped" and, if grouped, may also have a grouped state of belonging to a particular tab group.

Continuing, if the parent tab is part of a tab group (i.e., "Yes"), step 804 automatically groups the new tab with the parent's tab group. As such, a new tab group is not created and the new tab is visually distinguished as belonging to the same tab group to which its parent tab belongs. Alternately, if the parent tab is not part of a tab group (i.e., "No" in step 802), step 806 automatically groups the new tab and the parent tab together to form a new tab group. As such, the parent tab and the new tab are visually distinguished as belonging to a new group.

Example User Interfaces—Moving Tabs

Recall that automatic grouping and ungrouping can be performed in response to a user interacting with tabs in a particular way, such as by causing a tab to be moved in a user interface window. As but one example, consider FIGS. 9-11 which illustrate example user interfaces in the context of browser window 202 described above.

Figure 9:
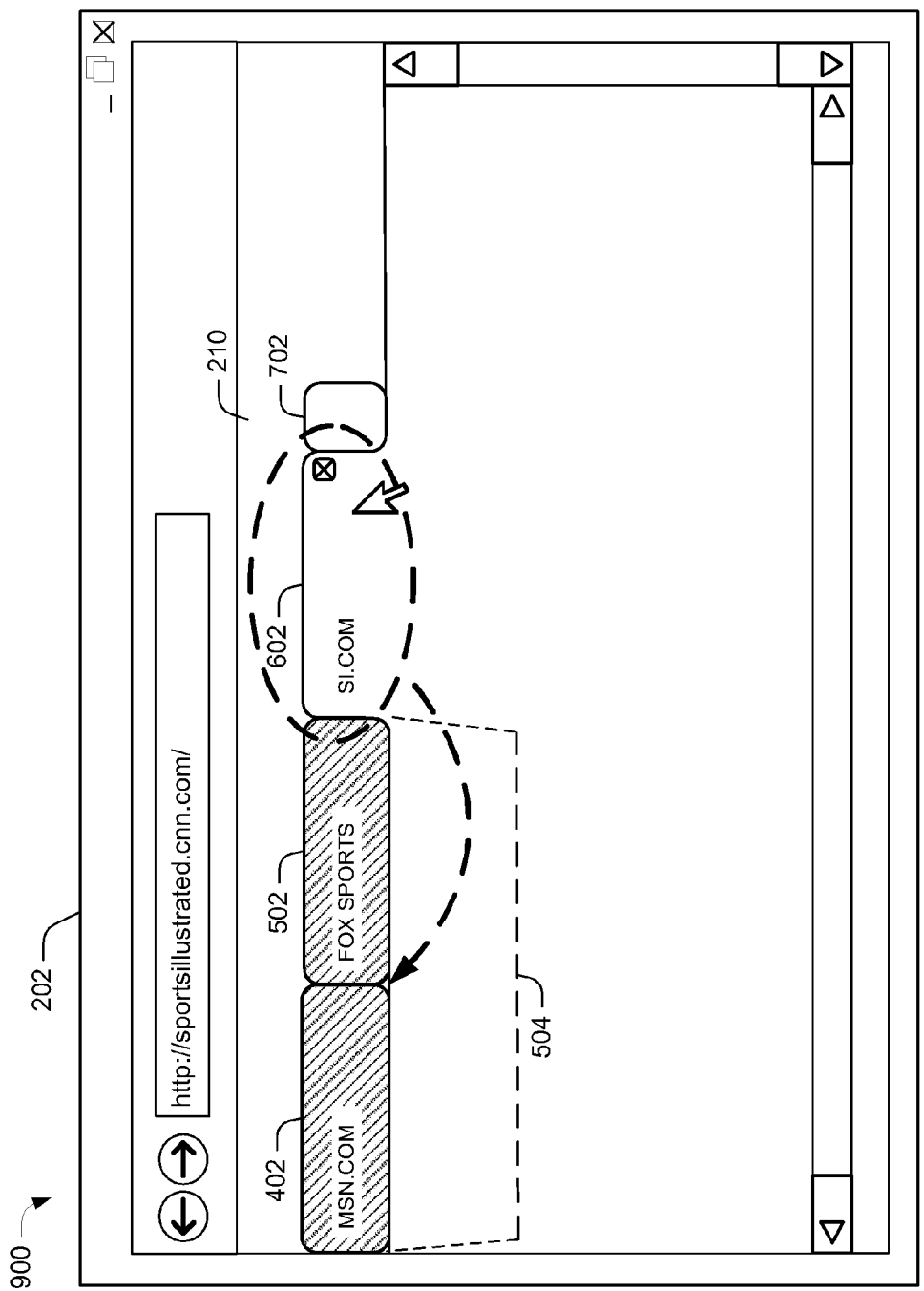
FIG. 9 illustrates a user interface in accordance with one or more embodiments.

Referring to FIG. 9, browser window 202, generally indicated at 900, includes tabs 402, 502, 602 and new tab button 702 which are presented in tab band 210. Tabs 402 and 502 are here visually distinguished as being grouped together in tab group 504. Furthermore, tab 602 is the active tab and is associated with an opened SPORTSILLUSTRATED-.CNN.COM web page.

Figure 10:
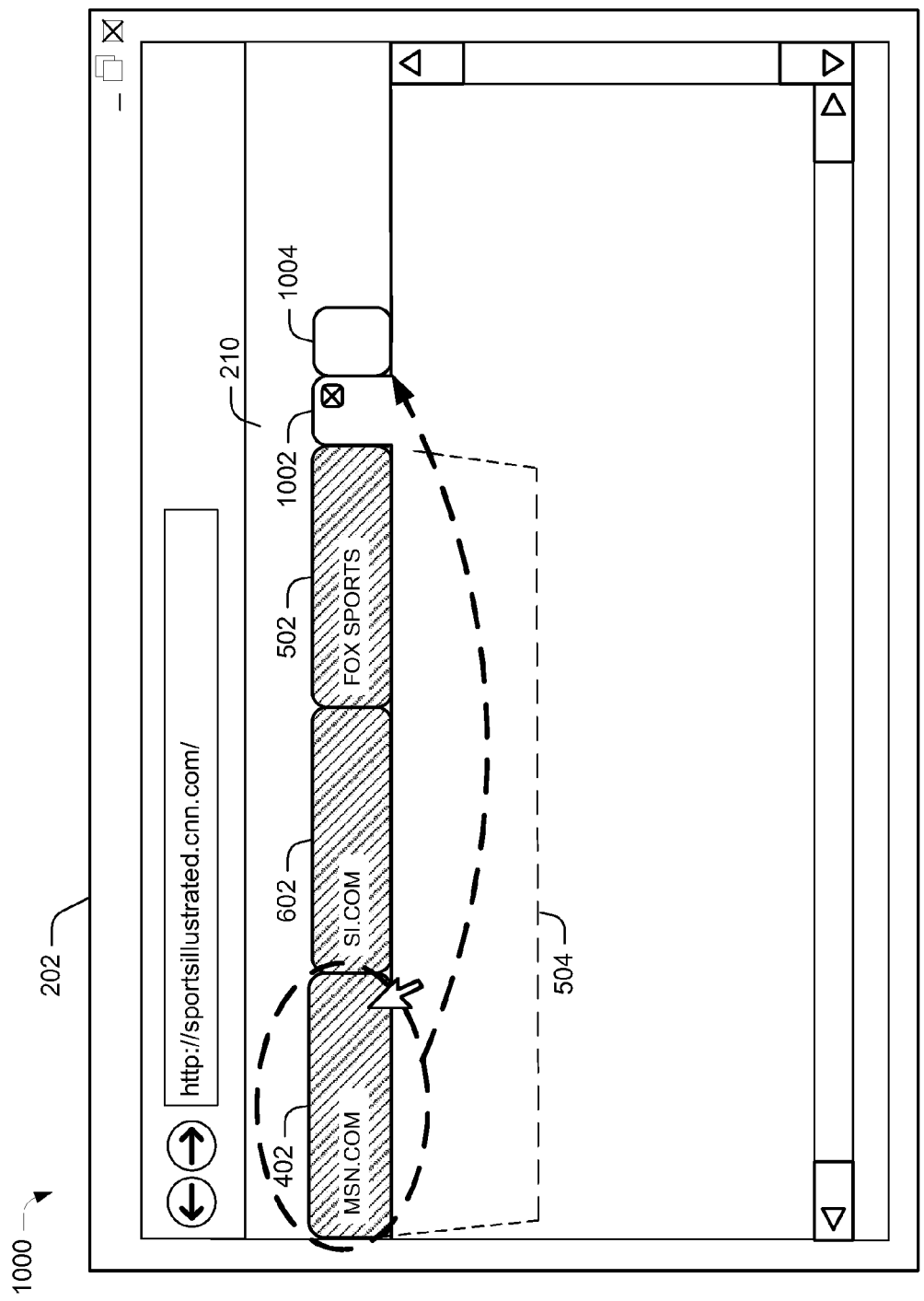
FIG. 10 illustrates a user interface in accordance with one or more embodiments.

Assume now that the user selects tab 602 (as shown by the dotted oval overlying tab 602 and the cursor overlying the dotted oval) and then causes tab 602, the selected tab, to be moved to a target location between tabs 402 and 502 (as shown by the dotted arrow leading from tab 602's current location to a new location between tabs 402 and 502). The user can cause tab 602 to be moved by any suitable means, such as by holding down a mouse button to "drag" tab 404 to the new target location and then releasing the mouse button to "drop" tab 602 there, for example. Once the user has moved tab 602 to the target location, the user is presented with a user interface as shown in FIG. 10 generally at 1000. In this example, note that tab 602 is grouped with tabs 402 and 502 in tab group 504 and is visually distinguished accordingly.

Figure 11:
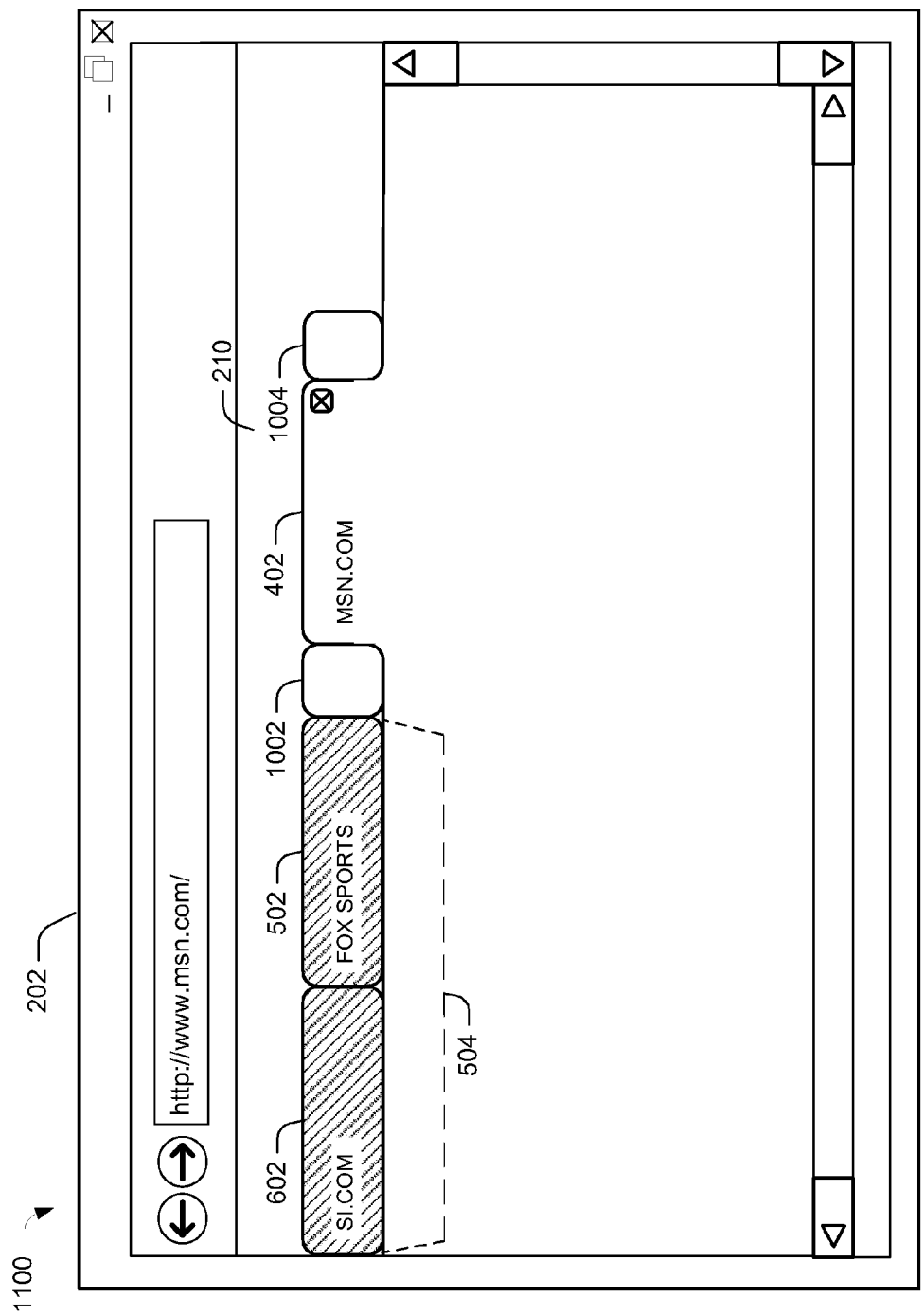
FIG. 11 illustrates a user interface in accordance with one or more embodiments.

Assume now that in FIG. 10 a new tab, depicted as active tab 1002, has been created by the user selecting new tab button 702 in a manner similar to that described for new tab 602 in FIG. 5 above. In addition, note that a new new tab button, depicted as new tab button 1004, has also been created. Continuing, now assume that the user selects and moves tab 402 to a location that is considered outside of group 504, such as a location that is not adjacent to either tab 602 or 502 for example. This is shown in FIG. 10 by the dotted oval overlying tab 402, the cursor overlying tab the dotted oval, and the dotted arrow leading from tab 402's current location to a new target location that is between tab 1002 and new tab button 1004 (but not adjacent to tab 602 or tab 502). The user can cause tab 402 to be moved by any suitable means, such as by dragging and dropping tab 402 as described above for example. Once the user has moved tab 402 to the target location, the user is presented with a user interface as shown in FIG. 11 generally at 1100. In this example, note that tab 402 is the active tab and is no longer grouped with tabs 602 and 502 in tab group 504.

Example Method—Moving a Tab

Figure 12:
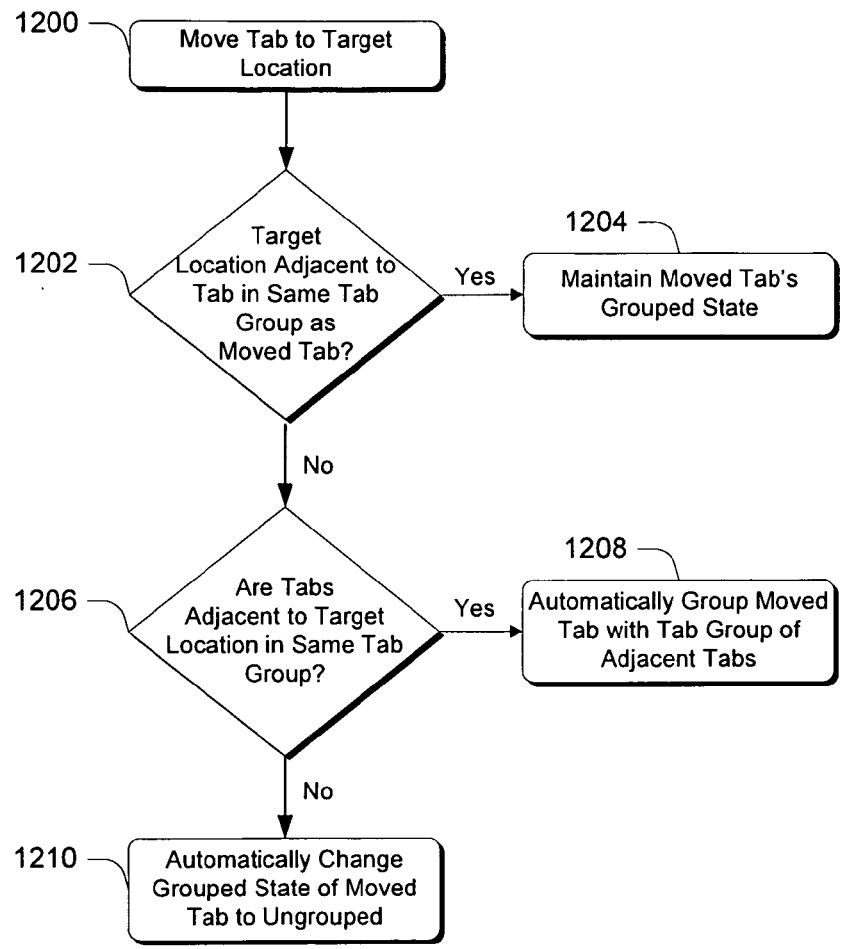
FIG. 12 is a flow diagram that describes steps in a method in accordance with one or more embodiments.

As but one example of the user interactions described above and illustrated in FIGS. 9-11, consider FIG. 12 which is a flow diagram that describes steps in a method in accordance with one or more embodiments. This method can be implemented in connection with any suitable hardware, software, firmware or combination thereof. In at least some embodiments, aspects of this method can be implemented by a suitable application implementing a suitable user interface window, such as web browser 110 and browser window 202 described and illustrated above. It is to be appreciated and understood, however, that aspects of the described method can be implemented by an application other than a web browser or a browser window.

Step 1200 moves a tab to a target location. The discussion below assumes that the moved tab currently belongs to a tab group. Situations for dealing with moving ungrouped tabs are covered in the discussion below as appropriate. As described and illustrated above, moving a tab can be accomplished by any suitable means such as dragging and dropping the tab being moved to a new and different location in the user interface window for example. Step 1202 then determines whether the target location is adjacent to a tab in the same tab group as the moved tab. If the target location is adjacent to a tab in the same tab group as the moved tab (i.e., "Yes"), then step 1204 maintains the moved tab's grouped state. As described above, a certain tab's grouped state can refer to any grouping-related characteristics of the certain tab, such as whether it is "grouped" or ungrouped" and, if grouped, the particular tab group that it belongs to. As such, assuming the moved tab belongs to a tab group, step 1204 maintains the moved tab's grouped state such that the moved tab remains grouped in the same tab group that it belonged to before it was moved. Here, it is worth noting that if the moved tab did not belong to a tab group (i.e., has group state of "ungrouped") before being moved, the moved tab's ungrouped state would be maintained.

Continuing, if the target location is not adjacent to a tab in the same tab group as the moved tab (i.e., "No"), step 1206 determines whether tabs adjacent to the target location are in the same tab group. In other words, a determination is made whether or not the moved tab has been moved to a target location between two tabs belonging to the same tab group. If the tabs adjacent to the target location are in the same tab group (i.e., "Yes"), step 1208 automatically groups the moved tab with the tab group to which the adjacent tabs belong. However, if the tabs adjacent to the target location are not in the same tab group (i.e., "No"), step 1210 automatically changes the grouped state of the moved tab to ungrouped. Here, it is worth noting that if the target location is only adjacent to one tab in a tab group (e.g., the target location is the rightmost or leftmost position in the tab band of the user interface window or the left-adjacent and right-adjacent tabs belong to different groups or at least one of the adjacent tabs belongs to no group at all), step 1206 determines "No" and step 1210 is performed since it cannot be determined that tabs adjacent to the target location are in the same tab group.

Example Method—Selecting an Active Tab

Figure 13:
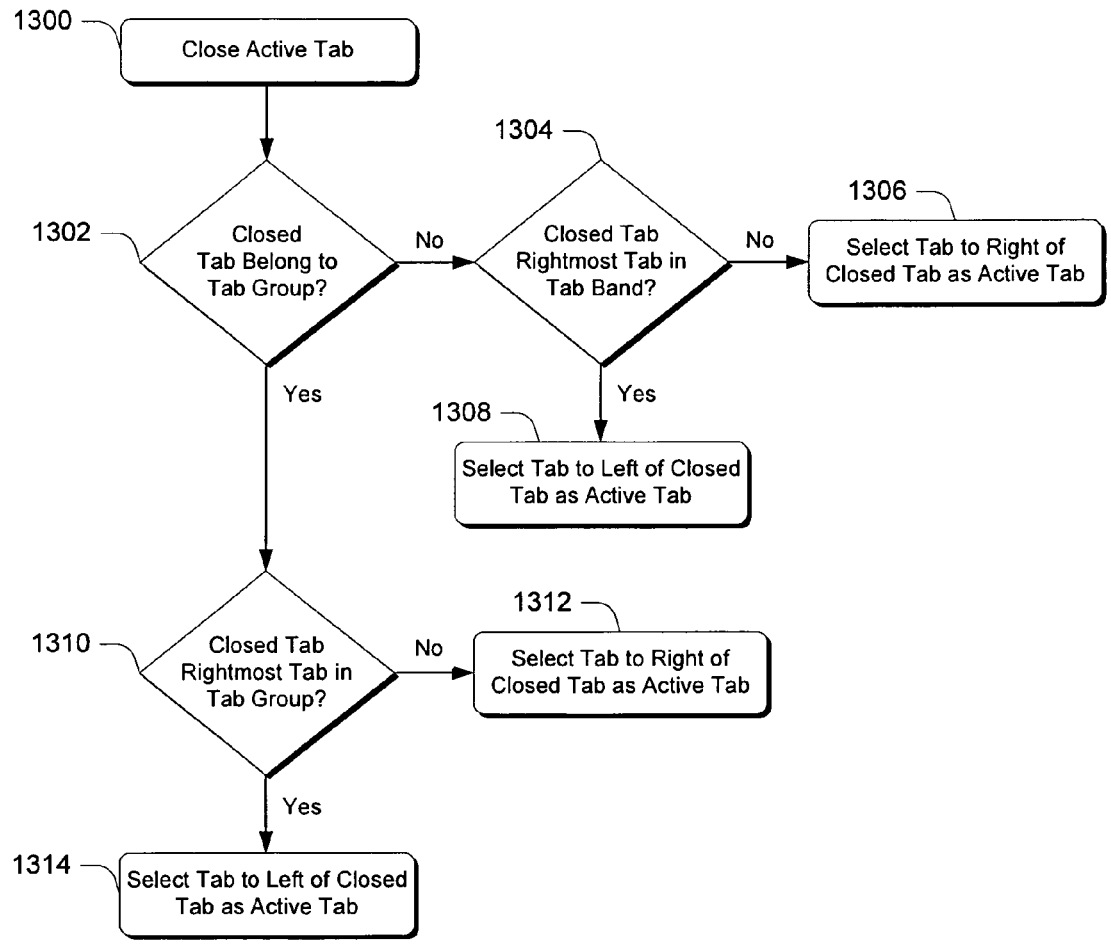
FIG. 13 is a flow diagram that describes steps in a method in accordance with one or more embodiments.

Recall that in at least some embodiments, certain tab-related actions can assist a user in finding a tab of interest or otherwise interacting with tabs and can be performed in a manner based at least in part on how the user groups and/or ungroups tabs, as described above and below. In this regard, one such tab-related action involves automatically selecting a new active tab when the current active tab in a user interface window is closed. As but one example of this, consider FIG. 13 which is a flow diagram that describes steps in a method in accordance with one or more embodiments. This method can be implemented in connection with any suitable hardware, software, firmware or combination thereof. In at least some embodiments, aspects of this method can be implemented by a suitable application implementing a suitable user interface window, such as web browser 110 and browser window 202 described and illustrated above. It is to be appreciated and understood, however, that aspects of the described method can be implemented by an application other than a web browser or a browser window.

Step 1300 closes an active tab. As noted above, an active tab in a user interface window is associated with an active web page (or other document) that is displayed in an active display area of the user interface window. An active tab can be closed in various ways. For example, recall from the discussion of FIG. 2 that an active tab can be depicted with a closing button, such as closing button 224 above, which when clicked closes the active tab and its associated web page. In addition, other ways of closing tabs can include, by way of example and not limitation, placing the cursor over a region of the tab to be closed, clicking the appropriate mouse button and selecting the "close" option from a drop-down menu that appears for example.

Step 1302 determines whether the closed tab belongs to a tab group. If the closed tab belongs to a tab group (i.e., "Yes"), the method proceeds to step 1310, as discussed below. However, if the closed tab does not belong to a tab group and thus has a grouped state of "ungrouped" (i.e., "No"), step 1304 determines whether the closed tab is the rightmost tab in the tab band of the user interface window. If the closed tab is not the rightmost tab in the tab band (i.e., "No"), then step 1306 selects the tab to the right of the closed tab as the active tab. However, if the closed tab is the rightmost tab in the tab band (i.e., "Yes"), step 1308 selects the tab to the left of the closed tab as the active tab.

If step 1302 determines that the closed tab belongs to a tab group (i.e., "Yes"), step 1310 determines whether the closed tab is the rightmost tab in the tab group to which it belongs. If the closed tab is not the rightmost tab in the tab group (i.e., "No"), step 1312 selects the tab to the right of the closed tab as the active tab. However, if step 1310 determines that the closed tab is the rightmost tab in the tab group (i.e., "Yes"), step 1314 selects the tab to the left of the closed tab as the active tab.

Example User Interfaces—Truncating Tab Titles

Another tab-related action which can be influenced by tab grouping or ungrouping involves changing how the title of a tab presented in a user interface window is displayed by truncating the displayed title in a particular manner. As but one example, consider FIGS. 14 and 15 which illustrate example user interfaces in the context of browser window 202 described above.

Figure 14:
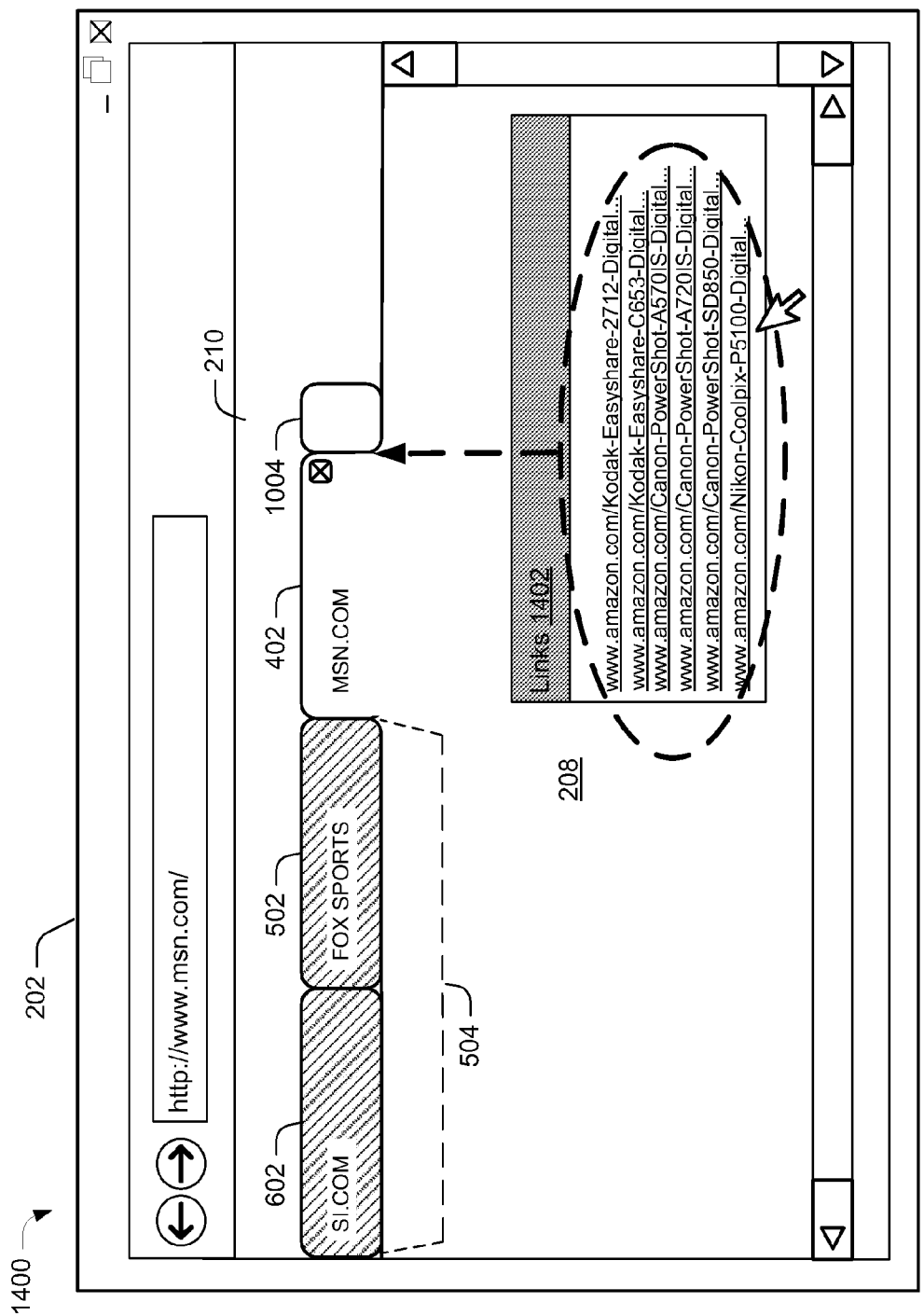
FIG. 14 illustrates a user interface in accordance with one or more embodiments.

Referring to FIG. 14, a browser window 202, generally at 1400, includes tabs 602, 502, 402 and new tab button 1004 presented in tab band 210. Tabs 602 and 502 are visually distinguished as being grouped together in tab group 504. Furthermore, tab 402 is the active tab and is associated with an opened MSN.COM web page.

Assume now that the user selects and opens multiple shopping links, and thus web pages from within the web page associated with the active tab. This is shown here by the dotted oval overlying links 1402 (which contain six URLs to six web pages) and the cursor overlying the dotted oval. In this case, the user is then presented with a user interface as shown in FIG. 15 generally at 1500.

Figure 15:
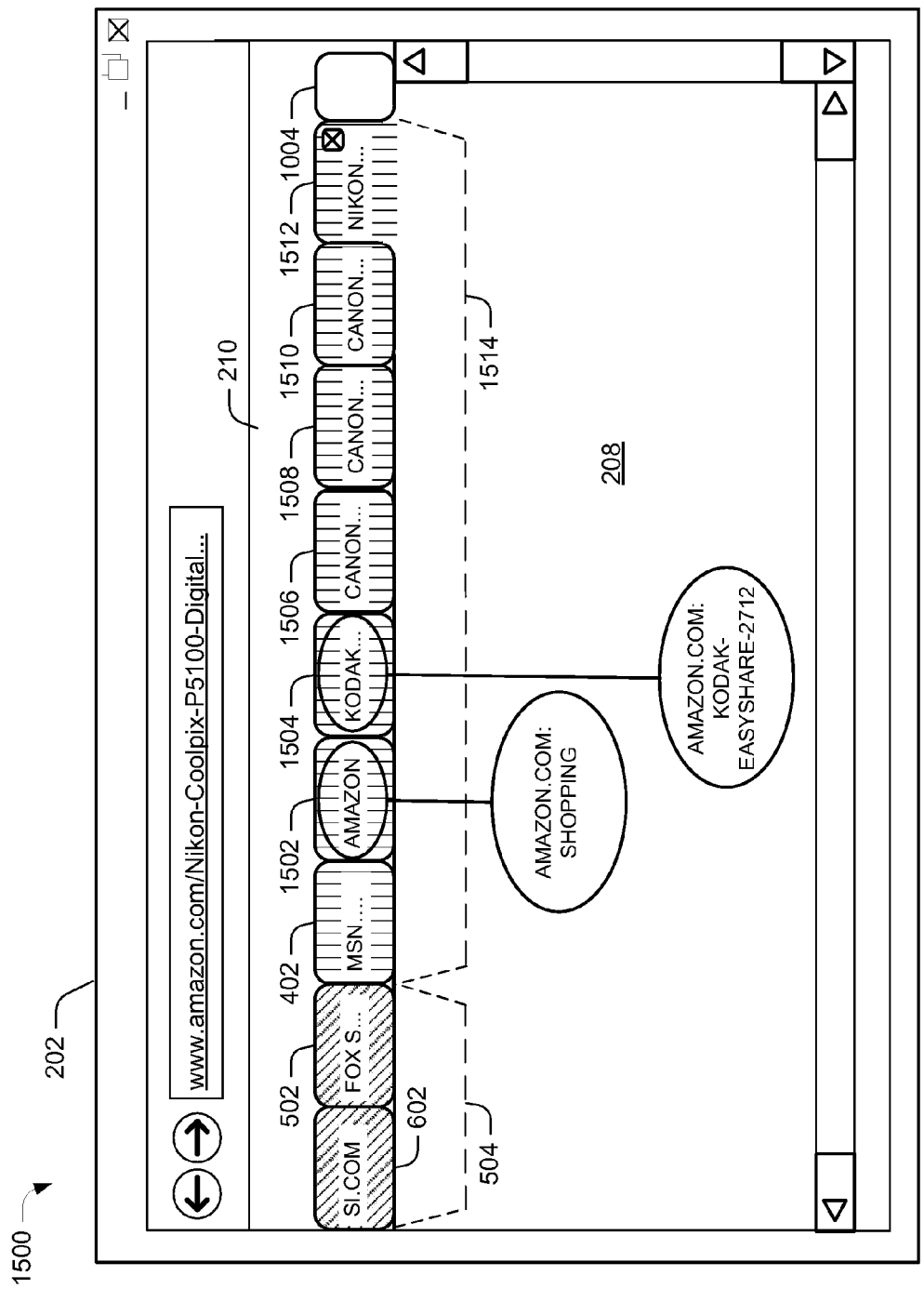
FIG. 15 illustrates a user interface in accordance with one or more embodiments.

In the example illustrated in FIG. 15, note that six new tabs (tabs 1502-1512), each associated with an opened web page, are automatically created. Also note that by virtue of being opened from within the web page associated with tab 402, these six new tabs are grouped with tab 402 in a new tab group, here designated tab group 1514. As described above in detail, in this example tab 402 can thus be considered the parent tab of tabs 1502-1512 and tabs 1502-1512 can be considered as child tabs.

Continuing, by virtue of the fact that a total of ten tabs are now presented in browser window 202, the width of each of the tabs has been decreased in order for each tab to be presented in tab band 210. As such, note that the available space on each tab to present its title is narrower or smaller and thus the title for a particular tab is less distinguishable. While it may be possible to decrease the text or increase the height of the tabs to some extent, at some point it becomes desirable to truncate a portion of one or more displayed titles in order to fit the tabs within browser window 202. This is illustrated here by the truncated title displayed for each of the tabs in tab band 210.

Consider now that in order to help a user find a tab of interest, it can be useful to truncate one or more of the displayed titles of the tabs in tab band 210 in a way that provides the user with as much information as possible. For example, note here that the prefix portion of each tab's title is indicative of the domain name of its associated web page. This is helpful with respect to tabs 602, 502, 402 and 1502 since each is associated with a web page having a distinct prefix, namely "SI.COM", "FOX SPORTS", "MSN.COM" and "AMAZON.COM". However, note that tabs 1502-1512 are all associated with same prefix ("AMAZON.COM"). This is illustrated here by the full tab title for tab 1502 ("AMAZON.COM: SHOPPING") and the full tab title for tab 1504 ("AMAZON.COM: KODAK-EASYSHARE-2712"). As such, truncating the suffix portion of each of these tabs would not further distinguish each of these tabs from one another. Accordingly, it may be helpful to truncate the displayed title of tabs 1504-1512 in order to remove redundant prefix text such that the available title space on these tabs can be used to display text that more specifically identifies each of these tabs—such as a title text following the redundant prefix text.

Specifically, in at least some embodiments such as the example illustrated here, the redundant prefix text "AMAZON.COM:" can be removed from all but one tab (tab 1502 here) in tab group 1514 because the user is still able to visually distinguish these tabs as belonging to tab group 1514—and thus as being associated with an AMAZON web page. Therefore, as shown here, the redundant displayed title text "AMAZON.COM:" from tabs 1504-1512 is removed and replaced with more descriptive text. In this example, this results in the displayed title text (for each of tabs 1504-1512) being more descriptive of each of these tab's associated web pages, namely "KODAK, "CANON" or "NIKON". This allows the user to more easily locate one of these tabs. For instance, if the user is looking for the tab associated with an opened web page describing a KODAK digital camera, the user can easily distinguish this tab, tab 1504, by its title—"KODAK".

Example Method—Truncating a Tab Title

Figure 16:
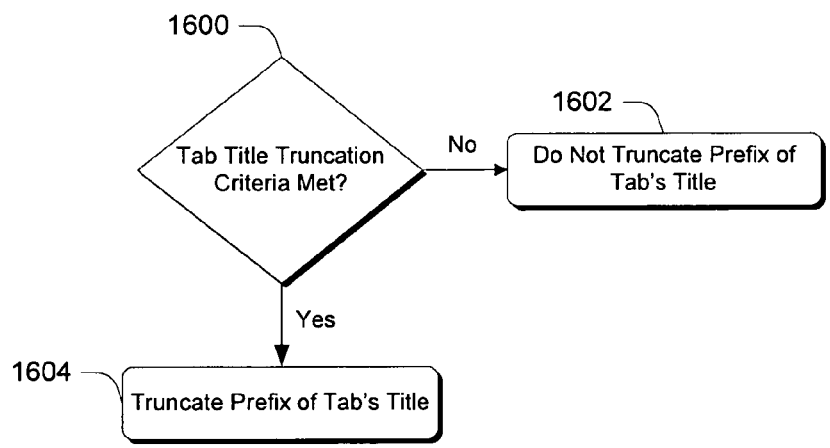
FIG. 16 is a flow diagram that describes steps in a method in accordance with one or more embodiments.

As but one example of truncating the title of a tab, consider FIG. 16 which is a flow diagram that describes steps in a method in accordance with one or more embodiments. This method can be implemented in connection with any suitable hardware, software, firmware or combination thereof. In at least some embodiments, aspects of this method can be implemented by a suitable application implementing a suitable user interface window, such as web browser 110 and browser window 202 described and illustrated above. It is to be appreciated and understood, however, that aspects of the described method can be implemented by an application other than a web browser or a browser window.

Step 1600 determines whether pre-defined tab title truncation criteria are met. These criteria can include, by way of example and not limitation, tab grouping criteria such as whether or not a certain tab belongs to a tab group. In addition, in at least some embodiments, these criteria can also include whether the tab is an active tab, whether the tab's title contains text already displayed on another tab in the same group (by searching for an indentified text pattern such as an certain delimiter followed by a space for instance) and/or whether the tab displays a favicon (an icon specific to the web page the tab is associated with). Of course, any number of suitable criteria can be defined.

If step 1600 determines that one or more of the tab title truncation criteria are not met (i.e., "No"), step 1602 does not truncate the prefix of the tab's title. As such, the tab's title is handled in a default manner which can be defined by the application/browser. In at least some embodiments, such as in the example user interface illustrated in FIG. 15, this can include truncating the suffix of the tab based on the amount of space available for presenting the title on the surface of the tab. If step 1600 determines that one or more of the tab title truncation criteria are met (i.e., "Yes"), step 1604 truncates the prefix of the tab's title. This can be accomplished in any suitable way. In at least some embodiments, this can include identifying prefix text likely to be redundant and already displayed on another tab of the same group.

Example Software Architecture

Figure 17:
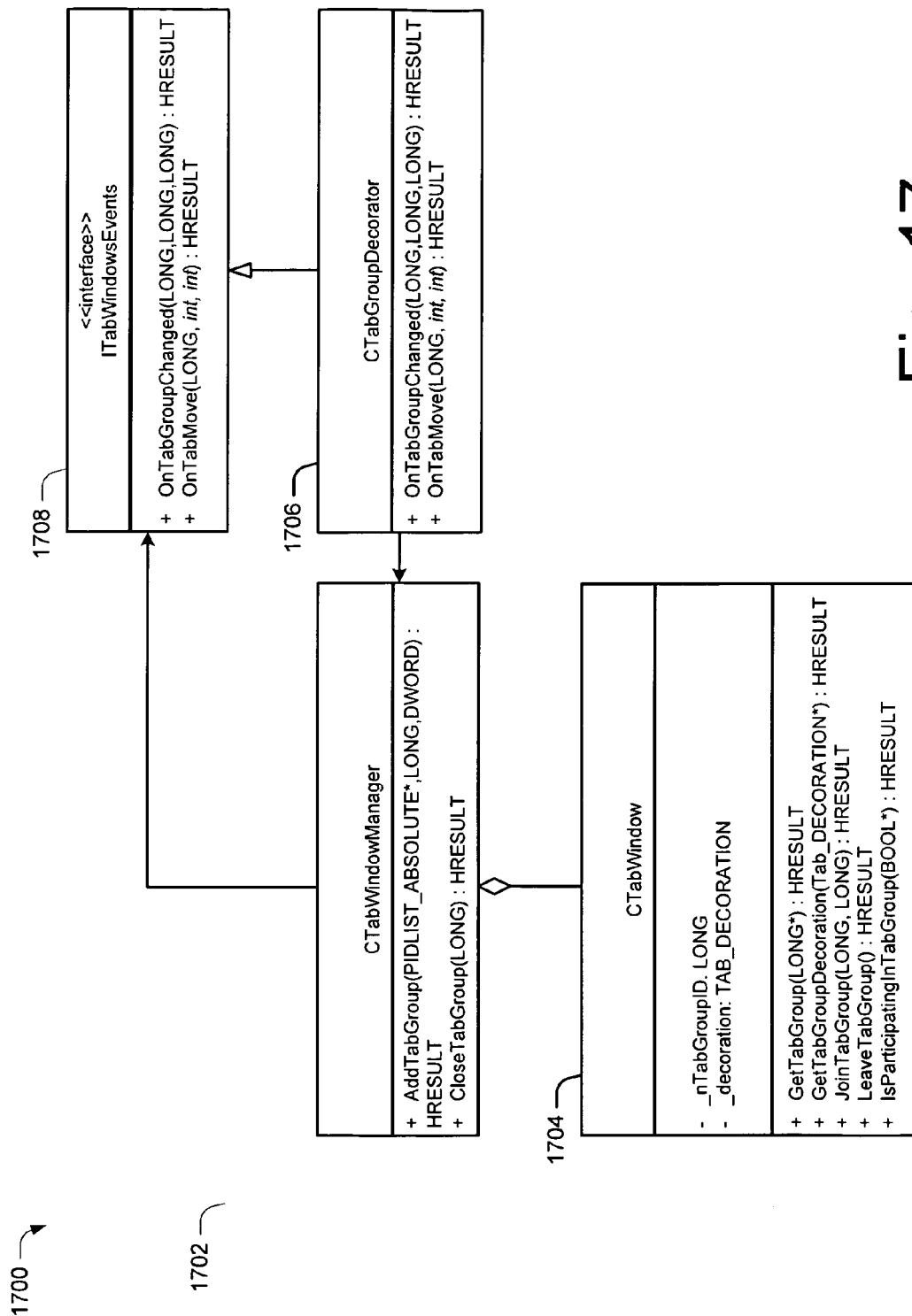
FIG. 17 illustrates an example software architecture in accordance with one or more embodiments.

FIG. 17 illustrates an example software architecture generally at 1700 in accordance with one or more embodiments. The architecture of FIG. 17 is depicted as several software objects or events. It is to be appreciated and understood that these software objects and events are not intended to represent a comprehensive software architecture for implementing the described techniques. Instead, the illustrated software objects and events are presented to facilitate the reader's appreciation and understanding of the described techniques. While example software architecture 1700 is described in the context of a web browser application and browser user interface window, as noted above, the architecture can be utilized in the context of any suitable application and/or user interface window.

In this particular example, architecture 1700 includes a TabWindowManager 1702, a TabWindow 1704, a TabGroupDecorator 1706 and a TabWindowsEvents 1708.

In one or more embodiments, TabWindowManager 1702 manages overall state information associated with each tab presented in a user interface window of a web browser application, such as browser window 202 for example. This object includes an application program interface which allows tabs to be added to a certain tab group. In one or more embodiments, each tab is associated with a tab window object, here designated as TabWindow 1704 described in more detail below. Each TabWindow includes its tab group identification ("_nTabGroupID. LONG") and its decoration characteristics (_decoration: TAB_DECORATION)—such as its pattern and/or color for instance.

The following methods, described briefly below, are associated with TabWindowManager 1702:

HRESULT AddTabGroup(PCIDLIST_ABSOLUTE *rgPidls, LONG cPidls, DWORD dwTabFlags): Adds all tabs in the PCIDLIST_ABSOLUTE in a single group.

HRESULT CloseTabGroup(LONG nTabGroupID): Closes every tab with the given group ID.

The following methods, described briefly below, are associated with TabWindow 1704:

HRESULT GetTabGroup(LONG *pnTabGroupID): Gets the tab group ID. Each group has a unique value that is independent of the visual appearance of the group.

HRESULT GetTabGroupDecoration(TAB_DECORATION *pTabDecoration): Gets the visual decoration for this tab, where TAB_DECORATION is an enum of the available decorations.

HRESULT JoinTabGroup(LONG nTabGroupID): Joins the tab to a group by setting the tab group ID. Joining group 0 is equivalent to LeaveTabGroup( ).

HRESULT LeaveTabGroup( ): Removes the tab from the current tab group and resets the group ID. It may be called on ungrouped tabs to ensure that they are not located inside of another group.

HRESULT IsParticipatingInTabGroup(BOOL *pfParticipatingInTabGroup): Returns whether this tab is participating in a tab group.

TabGroupDecorator 1706 is responsible for assigning the tab group decorations (e.g., distinctive patterns and/or colors) and ensuring that the tabs are in a reasonable state with respect to how the user perceives the groups. The following events, described briefly below, are associated with TabGroupDecorator 1706 object and TabWindowsEvents object 1708:

HRESULT OnTabGroupChanged(LONG nTabID, LONG nTabGroupID, LONG nOldTabGroupID): This event is fired when the group for a tab has changed and it is joining or leaving a tab group.

HRESULT OnTabMove(LONG nTabID, int nOldIndex, int nNewIndex): This fires when the user has repositioned a tab, with enough information to determine the original location of the tab.

Below, a brief discussion of certain tab-related actions is now described in the context of the objects shown in example software architecture 1700.

Assigning Visual Appearance to Tabs

As noted above, in this example architecture, TabGroupDecorator 1706 internally manages mappings between tab group IDs and tab decorations and pushes the decoration down to the tab as needed. This single location ensures that the visual indicia is consistent across multiple places in the application user interface where tabs are shown, such as in the tab band, quick tabs, and tab list menu. TabGroupDecorator 1706 effectively monitors events associated with the TabWindowManager 1702 by subscribing to an interface object, here designated TabWindowsEvents 1708. As such, TabGroupDecorator 1706 is able to detect when tabs are created, removed, or moved. It can then set the appropriate decorations and update the order of the tabs. When assigning decorations, TabGroupDecorator 1706 is responsible for ensuring that the new decoration is not the same as the tabs adjacent to the insertion point. In addition, as tabs are dragged or deleted it can alter the visual appearance for a tab group if necessary. Note that decoration data can be stored for each tab as a tab property so that the tab band in the user interface window can be notified whenever a tab property changes.

Grouping Tabs During Tab Creation/Opening

In one or more embodiments, tabs can be created via a TabWindow event or via a TabWindowManager event. For the first, a new tab can be created by a user opening a link from a current active tab. For the second, when more than one tab is opened as a group, these tabs can be grouped together as a tab group.

Ungrouping Tabs

In one or more embodiments, tabs can be ungrouped by (1) a user selecting a context menu to remove a tab from the group, (2) performing a top-level navigation using the address bar, search bar, or other menu feature, or (3) dragging a tab out of a first tab group and into a second tab group. For item (1), an event associated with TabWindow 1704 for removing a tab from a tab group can be used. Specifically, TabWindow 1704 can notify TabWindowManager 1702 which will then fire an OnTabGroupChanged event. TabGroupDecorator 1706 will then update the decoration property from the tab that was removed from the tab group. For item (2), TabWindow 1704 itself is responsible for detecting top-level navigations and resetting its own tab group. Cases where this is not detectable by TabWindow 1704 are handled similarly to the first way described above and can be dealt with on a case-by-case basis. For item (3), when a tab leaves its original tab group and is moved to a new location, TabWindowManager 1702 detects the tab group of the tab(s) adjacent to the moved tab in its new location and bubbles, or moves, the tab to the appropriate position within this tab group. The order of the tabs is the same as the order of the items in the TabWindowManager's collection, so the implementation simply calls TabWindowManager 1702 to fire an event to reposition the tab to a new target location.

Visual Appearance of Tab Groups

In scenarios where a tab has been moved, removed from a tab group or deleted, TabGroupDecorator 1706 may also do a pass to check tab decorations to make sure that adjacent groups do not have the same decoration. With respect to the tab band, it will be modified to recognize tabs that are participating in a tab group and assign attributes for decorating the tab as appropriate.

Tab Open Location

An event associated with TabWindow 1704 can be used to track the index of a tab that the next tab should open after. With tab grouping, this can be removed and the algorithm can simply progress to the end of the current group by comparing tab group identities (Tab Group IDs) and group participation, and inserting the new tab immediately before the next tab group, ungrouped tab, or at the end if there are no tabs to the right. Note that one feature of this algorithm is that in addition to being grouped, tabs can also be positioned or kept within the group according to the chronological order in which they were opened.

Closing Tabs in a Group

In one or more embodiments, a default behavior can be implemented to select a tab to the right of the closed tab if one exists or otherwise select the tab to the left. However, new behavior directed at selecting a new tab that is in the current group—if possible—can supplement this default behavior. This simply involves ensuring that the appropriate event associated with TabWindowManager 1702 includes the following logic: If the tab is part of a group, then a check is performed as to whether the next tab is part of the same group. If the next tab is not part of the same group, then a check is performed as to whether the previous tab is part of the same group. If the previous tab is part of the same group then the tab to the left is selected. For all other cases, selection is performed based on the implementing application.

Tab Dragging

In one or more embodiments, TabGroupDecorator 1706 can be notified when a tab is repositioned using either the mouse or keyboard both the original location and new target location. TabGroupDecorator 1706 will then assign a group to the tab using the following logic:

If the tab is part of a group and the repositioned location is adjacent to another tab in the same group, no change is made.

If the tab is repositioned to a target location between two tabs in the same group, the tab is joined to that group (regardless of whether the tab was originally part of another tab group).

If the tab is part of a group and is repositioned in a way such that neither of the above two conditions apply, the tab will leave its current group and remain ungrouped.

Accessibility

In one or more embodiments, with respect to exposing tab groups, when a screen reader is enabled in the user interface window, TabWindow 1704 can automatically append "Tab Group <n>" to the tab title based on the tab group ID such that the first group is '1', and it increments for the lifetime of the window. With respect to keyboard shortcuts, appropriate objects (not shown) can internally handle the keyboard shortcuts to cycle between groups and do extended drag and drop operations in a way that's similar to how tab dragging works today.

Example System

FIG. 18 illustrates an example computing device 1800 that can implement the various embodiments described above. Computing device 1800 can be, for example, computing device 102 of FIG. 1 or any other suitable computing device.

Computing device 1800 includes one or more processors or processing units 1802, one or more memory and/or storage components 1804, one or more input/output (I/O) devices 1806, and a bus 1808 that allows the various components and devices to communicate with one another. Bus 1808 represents one or more of any of several types of bus structures, including a memory bus or memory controller, a peripheral bus, an accelerated graphics port, and a processor or local bus using any of a variety of bus architectures. Bus 1808 can include wired and/or wireless buses.

Memory/storage component 1804 represents one or more computer storage media. Component 1804 can include volatile media (such as random access memory (RAM)) and/or nonvolatile media (such as read only memory (ROM), Flash memory, optical disks, magnetic disks, and so forth). Component 1804 can include fixed media (e.g., RAM, ROM, a fixed hard drive, etc.) as well as removable media (e.g., a Flash memory drive, a removable hard drive, an optical disk, and so forth).

One or more input/output devices 1806 allow a user to enter commands and information to computing device 1800, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

Techniques to facilitate finding or otherwise interacting with a tab or tabs in a user interface window are described. Specifically, various embodiments provide for presenting tabs, individual tabs being associated with an opened document such as a web page or an activity, in a user interface window and automatically grouping at least some of the tabs together in a visually distinctive way. In at least some embodiments, this grouping is performed in response to a user interacting with the tabs in a particular way. For instance, a user may cause a tab to be created or moved within the user interface window such that the tab is grouped with a tab group or ungrouped from a tab group. Furthermore, one or more embodiments provide for certain tab-related actions, such as selecting an active tab and changing the display of a tab's title, which can be performed in a manner based at least in part on this grouping.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising
presenting, in a browser user interface window, a plurality of tabs individual ones of which being associated with web pages or activities that have been opened;
automatically grouping multiple tabs of the plurality of tabs together in a tab group and in a visually-distinctive way, said automatically grouping being performed responsive to a user interaction with one or more of the multiple tabs;
receiving an indication that a current active tab of the multiple tabs is being closed, the current active tab being a rightmost tab in the tab group and not a rightmost tab in the plurality of tabs; and
responsive to receiving the indication, automatically selecting a new active tab from the tab group and based on the new active tab being part of the tab group, said automatically selecting comprising selecting as the new active tab a tab that is positioned to the left of the current active tab of the multiple tabs.

2. The method of claim 1, wherein said automatically grouping is performed by grouping tabs using a visually distinctive color.

3. The method of claim 1, wherein said automatically grouping is performed by grouping tabs using a visually distinctive pattern.

4. The method of claim 1, wherein said automatically grouping is performed by grouping tabs using a visually distinctive color and pattern.

5. The method of claim 1, wherein said automatically grouping is performed by grouping one or more of the multiple tabs adjacent to at least one other of the multiple tabs in the tab group.

6. The method of claim 1, wherein said user interaction comprises creating a new tab by opening a web page or activity from within a tabbed web page or respective activity associated with a parent tab.

7. The method of claim 1, further comprising one or both of:
ungrouping a tab responsive to a user moving a tab to be ungrouped outside of a tab group; and
changing a display of a title of a tab based at least in part on a grouping.

8. The method of claim 1, further comprising limiting a number of tab groups, including the tab group, that are permitted to be created in the user interface window based on a predetermined threshold.

9. One or more computer-readable storage devices embodying computer-readable instructions which, when executed, implement a method comprising:
presenting multiple tabs in a user interface window, at least some of the multiple tabs having an associated document or activity;
associating a subset of tabs of the multiple tabs together in a tab group, the multiple tabs including one or more other tabs that are not included in the tab group;
visually distinguishing individual tabs of the tab group, wherein visually distinguishing comprises:
depicting the individual tabs of the tab group in a location indicative of the tab group;
depicting the individual tabs of the tab group with one or more visual indicia indicative of the tab group, the individual tabs of the tab group sharing one or more common visual indicia; and
removing redundant prefix text from titles of all but one of the individual tabs of the tab group; and
receiving an indication that a current active tab of the multiple tabs is being closed, the current active tab being a rightmost tab in the tab group and not a rightmost tab of the multiple tabs; and
responsive to receiving the indication, automatically selecting a new active tab from the tab group, the new active tab being part of the tab group and positioned to the left of the current active tab.

10. The one or more computer-readable storage devices of claim 9, wherein associating is performed responsive to a new document or activity being opened from a document or respective activity associated with one of the multiple tabs.

11. The one or more computer-readable storage devices of claim 9, wherein associating is performed responsive to one of the multiple tabs being moved to within the tab group.

12. The one or more computer-readable storage devices of claim 9, wherein the one or more visual indicia comprise one or both of a color or pattern.

13. The one or more computer-readable storage devices of claim 9, further comprising truncating a portion of a tab's displayed title based on one or more criteria.

14. The one or more computer-readable storage devices of claim 13, wherein the one or more criteria comprise at least one of:

whether a tab is an active tab in the user interface window;
whether a tab belongs to tab group; or
whether a tab's title contains a pattern that indicates a portion of the title is displayed on another tab in the tab group.

15. One or more computer-readable storage devices embodying computer-readable instructions which, when executed, provide:
   a web browser comprising a user interface window configured to present a plurality of tabs, each tab being associated with a corresponding opened web page; and
   a tab management module associated with the web browser and configured to automatically group two or more of the plurality of tabs together in a tab group and in a visually-distinctive way responsive to one or more of the following:
      opening a tab in the user interface window by opening a web page from within an opened web page; or
      moving one or more of the plurality of tabs within the user interface window,
   the tab management module being further configured to:
      receive an indication that a current active tab is being closed, the current active tab being a rightmost tab in the tab group and not a rightmost tab in the plurality of tabs presented in the user interface window; and
      responsive to the indication that the current active tab is being closed, select as a new active tab an adjacent tab that is positioned to the left of the current active tab and based on the new active tab being part of the tab group.

16. The one or more computer-readable storage devices of claim 15, wherein the tab management module automatically groups tabs by depicting two or more tabs with a common color.

17. The one or more computer-readable storage devices of claim 15, wherein the tab management module automatically groups tabs by depicting two or more tabs with a common pattern.

18. The one or more computer-readable storage devices of claim 15, wherein the tab management module comprises part of the web browser.

19. The one or more computer-readable storage devices of claim 15, wherein the tab management module is further configured to, responsive to one or more of the plurality of tabs being moved within the user interface window:
   maintain the one or more of the plurality of tabs as part of the tab group when the one or more of the plurality of tabs is moved to a position that is adjacent to at least one other tab in the tab group; or
   join the one or more of the plurality of tabs to a different tab group when the one or more of the plurality of tabs is moved to a position that is between two tabs in a different tab group.

20. The one or more computer-readable storage devices of claim 15, wherein the tab management module is further configured to change a display of a title of a tab based on one or more of:
   whether a tab is an active tab in the user interface window; or
   whether a tab is grouped with one or more other tabs.

* * * * *